United States Patent
Kamei et al.

(10) Patent No.: US 7,805,475 B2
(45) Date of Patent: Sep. 28, 2010

(54) CONTENTS DISTRIBUTION SYSTEM, TERMINAL APPARATUS, CONTENTS DISTRIBUTION METHOD, AND RECORDING MEDIUM ON WHICH IS RECORDED A PROGRAM USED THEREIN

(75) Inventors: Masahiro Kamei, Nagoya (JP); Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 363 days.

(21) Appl. No.: 12/068,219

(22) Filed: Feb. 4, 2008

(65) Prior Publication Data
US 2008/0215594 A1 Sep. 4, 2008

(30) Foreign Application Priority Data
Mar. 2, 2007 (JP) ............................. 2007-053464

(51) Int. Cl.
*G06F 17/30* (2006.01)
(52) U.S. Cl. ........................... 707/999.001; 707/999.01
(58) Field of Classification Search .......... 707/999.001, 707/999.01
See application file for complete search history.

(56) References Cited

U.S. PATENT DOCUMENTS

| 2007/0133587 A1 | 6/2007 | Hibino et al. |
| 2008/0317250 A1* | 12/2008 | Matsuo et al. ............... 380/279 |
| 2009/0180493 A1* | 7/2009 | Hirano et al. ................ 370/464 |

FOREIGN PATENT DOCUMENTS

JP A 2006-033514 2/2006

* cited by examiner

*Primary Examiner*—Jean M Corrielus
(74) *Attorney, Agent, or Firm*—Oliff & Berridge, PLC

(57) ABSTRACT

A terminal apparatus in a contents distribution system stores previously connected terminal apparatus, correlated to a contents channel. Also, the terminal apparatus, in the event that an instruction to change a contents channel is issued, selects a terminal apparatus, from among the previously connected terminal apparatus, corresponding to the contents channel for which the change instruction has been issued, and requests of the selected terminal apparatus a connection destination candidate corresponding to the contents channel for which the change instruction has been issued. Then, the terminal apparatus selects the requested connection destination candidate corresponding to the contents channel, and notifies the terminal apparatus which has requested the connection destination candidate. Then, the terminal apparatus receives, and connects to, the reported connection destination candidate.

17 Claims, 17 Drawing Sheets

LOGICAL TOPOLOGY
(CONTENTS CHANNEL 1)

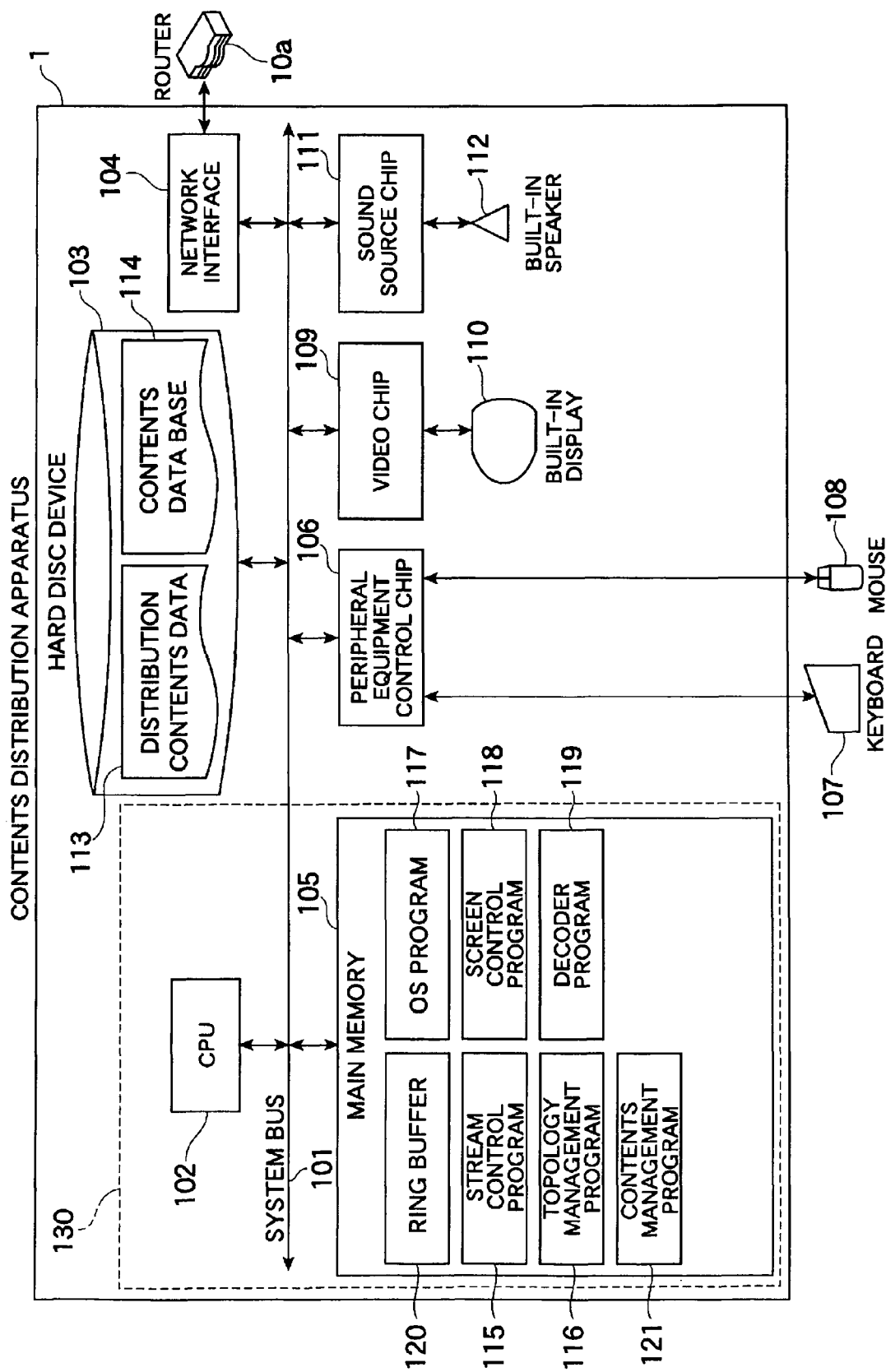

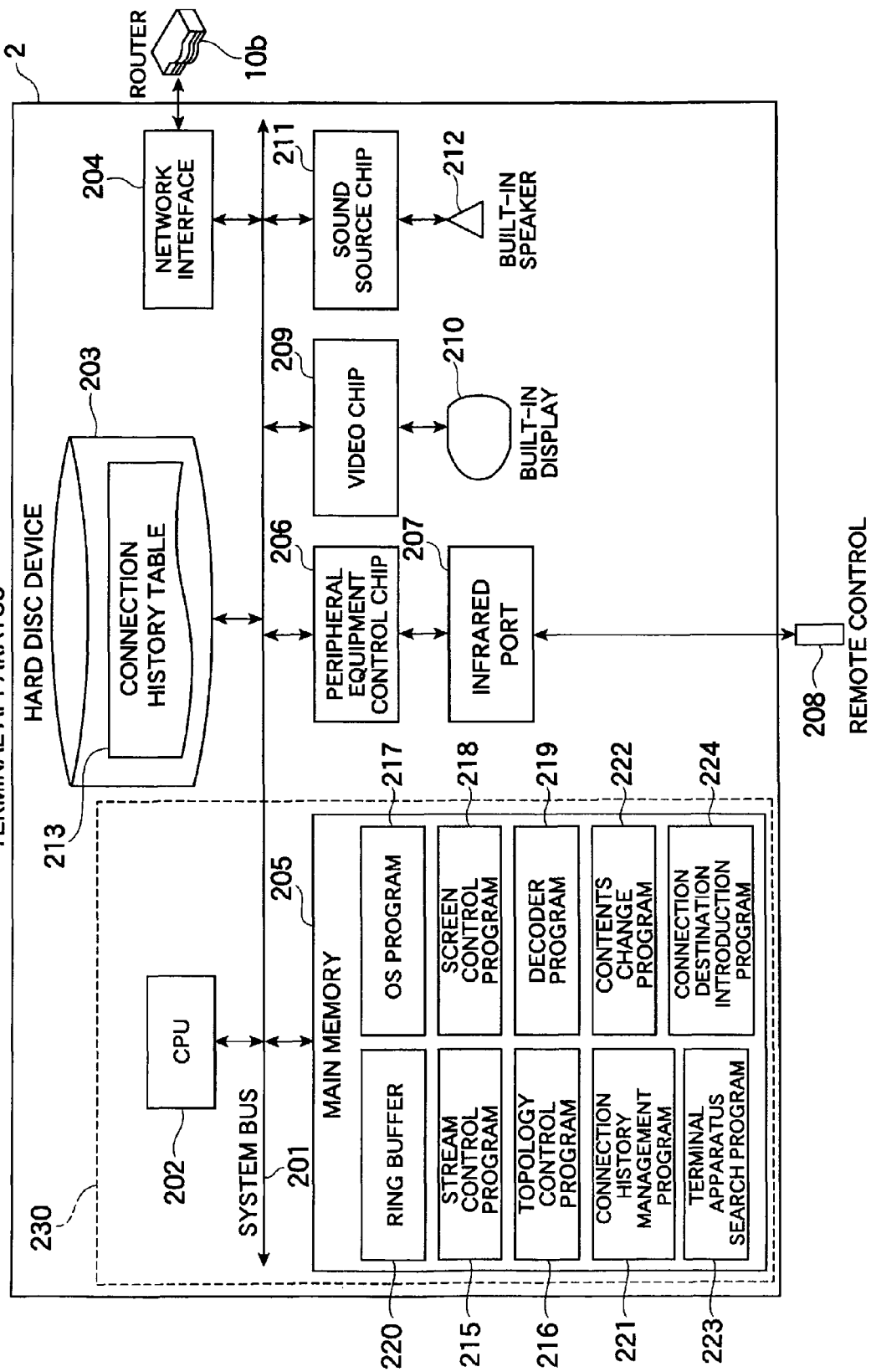

Fig. 6

CONNECTION HISTORY TABLE

| CONNECTION SEVERANCE TIME AND DATE | CONTENTS CHANNEL | TERMINAL APPARATUS IDENTIFICATION INFORMATION |
|---|---|---|
| 2007/02/02 22:45 | ch0002 | IDENTIFICATION INFORMATION a |
| 2007/02/02 22:45 | ch0002 | IDENTIFICATION INFORMATION b |
| 2007/02/02 22:45 | ch0002 | IDENTIFICATION INFORMATION c |
| 2007/02/02 22:12 | ch0003 | IDENTIFICATION INFORMATION d |
| 2007/02/02 22:12 | ch0003 | IDENTIFICATION INFORMATION e |
| 2007/02/02 22:12 | ch0003 | IDENTIFICATION INFORMATION f |
| 2007/02/01 19:05 | ch0002 | IDENTIFICATION INFORMATION g |
| ... | ... | ... |

CONTENTS DISTRIBUTION SYSTEM, TERMINAL APPARATUS, CONTENTS DISTRIBUTION METHOD, AND RECORDING MEDIUM ON WHICH IS RECORDED A PROGRAM USED THEREIN

CROSS-REFERENCE TO RELATED APPLICATION

This application is based on and claims the benefit of priority from Japanese Patent Application No. 2006-03103 filed on Mar. 2, 2007; the entire contents of which are incorporated herein by reference.

BACKGROUND OF THE INVENTION

1. Field of the Invention

The present invention relates to a contents distribution system, a terminal apparatus and a contents distribution method, as well as to a recording medium on which is recorded a program used therein, and in particular, relates to a contents distribution system, a terminal apparatus and a contents distribution method, as well as to a recording medium on which is recorded a program used therein, which distribute contents data, connected in a multi-leveled hierarchical structure on a network for each of a plurality of contents channels, with a contents distribution apparatus as an apex.

2. Description of the Related Art

In recent years, a contents distribution service, which carries out a streaming distribution of contents data (hereafter also referred to as "contents") such as music, a movie or a talk show, via a network such as an internet, has begun to be launched.

This kind of contents distribution service includes one which carries out a distribution of contents in a condition in which a plurality of client terminal apparatus are connected in a multi-leveled hierarchical structure for each contents channel, with a distribution server as an apex. Also, a connection management server being installed in this kind of contents distribution service, it manages a connection condition of the distribution server and the client terminal apparatus. Specifically, for example, as described in Japanese Unexamined Patent Publication No. 2006-33514, in the event of changing a contents channel, such as when responding to an operation by a user, or when a connection is severed, a connection destination candidate is requested of the connection management server by a terminal apparatus and, by the connection management server selecting the connection destination candidate, and reporting it, it is possible, in the terminal apparatus which has made the request, to recognize a distribution server or other terminal apparatus to which a connection is possible.

SUMMARY OF THE INVENTION

However, in the heretofore described contents distribution system, there being a danger of an increase in accesses between the terminal apparatus and the connection management server, accompanying a cause such as an increase in the terminal apparatus, there is a desire to avoid a burden on the connection management server and an increase in traffic.

Therein, according to one aspect of the invention, there is provided a contents data distribution system including: a contents distribution apparatus which distributes contents data via a network; and a plurality of terminal apparatus which, being connected in a multi-leveled hierarchical structure on the network for each of a plurality of contents channels, with the contents distribution apparatus as an apex, receive the contents data via the network, and reproduce them. In this case, the terminal apparatus include: a connection unit which connects to the contents distribution apparatus or to other terminal apparatus, via the network; a connection terminal apparatus storage unit which stores a terminal apparatus previously connected by the connection unit, correlated to a contents channel; a contents channel change determination unit which determines whether or not a change instruction, changing a contents channel, has been issued; a connection destination candidate introduction terminal apparatus selection unit which, in the event that it is determined by the contents channel change determination unit that an instruction to change a contents channel has been issued, selects a terminal apparatus, from among the other terminal apparatus connected by the connection unit, or the previously connected terminal apparatus stored by the connection terminal apparatus storage unit in the terminal apparatus itself, corresponding to the contents channel for which the change instruction has been issued, as a connection destination candidate introduction terminal apparatus which introduces a connection destination candidate; a connection destination candidate request unit which requests a connection destination candidate, corresponding to the contents channel for which the change instruction has been issued, of the connection destination candidate introduction terminal apparatus selected by the connection destination candidate introduction terminal apparatus selection unit; a connection destination candidate selection unit which selects a connection destination candidate corresponding to the contents channel requested by the connection destination candidate request unit; a connection destination candidate notification unit which notifies the terminal apparatus which has requested the connection destination candidate of the connection destination candidate selected by the connection destination candidate selection unit; and a connection destination candidate reception unit which receives the connection destination candidate reported by the connection destination candidate notification unit. The connection unit has a function of connecting to the connection destination candidate received by the connection destination candidate reception unit.

Also, according to another aspect of the invention, there is provided a contents data distribution system including: a contents distribution apparatus which distributes contents data via a network; a plurality of terminal apparatus which receive the contents data via the network, and reproduce them; and a connection management apparatus which manages a connection condition of the contents distribution apparatus and plurality of terminal apparatus on the network. In this case, the connection management apparatus includes: a connection condition information storage unit which stores connection condition information of the plurality of terminal apparatus, connected in a multi-leveled hierarchical structure on the network for each of a plurality of contents channels, with the contents distribution apparatus as an apex; a first connection destination candidate selection unit which, based on the connection condition information stored by the connection condition information storage unit, selects a connection destination candidate in such a way that a plurality of terminal apparatus are connected in a multi-leveled hierarchical structure on the network, with the contents distribution apparatus as an apex; and a first connection destination candidate notification unit which notifies a terminal apparatus of a connection destination candidate selected by the first connection destination candidate selection unit. The terminal apparatus include: a connection unit which connects to the contents distribution apparatus or to other terminal apparatus, via the network; a connection terminal apparatus storage unit which stores a terminal apparatus previously connected by the connection unit, correlated to a contents channel; a contents channel change determination unit which determines whether or not a change instruction, changing a contents channel, has been issued; a connection destination candidate introduction terminal apparatus selection unit which, in the event that it is determined by the contents channel change determination unit that an instruction to change a contents channel has been issued, selects a terminal apparatus, from among the other terminal apparatus connected by the connection unit, or the previously connected terminal apparatus stored by the connection terminal apparatus storage unit in the terminal apparatus itself, corresponding to the contents channel for which the change instruction has been issued, as a connection destination candidate introduction terminal apparatus which introduces a connection destination candidate; a second connection destination candidate request unit which requests a connection destination candidate, corresponding to the contents channel for which the change instruction has been issued, of the connection destination candidate introduction terminal apparatus selected by the connection destination candidate introduction terminal apparatus selection unit; a second connection destination candidate selection unit which selects a connection destination candidate corresponding to the contents channel requested by the second connection destination candidate request unit; a second connection destination candidate notification unit which notifies the terminal apparatus which has requested the connection destination candidate of the connection destination candidate selected by the second connection destination candidate selection unit; a connection destination candidate reception unit which receives the connection destination candidate reported by the second connection destination candidate notification unit; and a first connection destination candidate request unit which, in the event that no connection destination candidate is received, by the connection destination candidate reception unit, from the connection destination candidate introduction terminal apparatus, requests a connection destination candidate, corresponding to the contents channel for which the change instruction has been issued, of the connection management apparatus. The connection destination candidate reception unit has a function of receiving a connection destination candidate corresponding to a predetermined contents channel reported by the first connection destination candidate notification unit, and the connection unit has a function of connecting to the connection destination candidate received by the connection destination candidate reception unit.

BRIEF DESCRIPTION OF THE DRAWINGS

FIG. 4 is a functional block diagram showing a contents distribution apparatus;

FIG. 5 is a functional block diagram showing a terminal apparatus;

FIG. 6 is an illustration showing a connection history table;

DESCRIPTION OF THE PREFERRED EMBODIMENTS

Hereafter, a description will be given, based on the drawings, of a preferred embodiment of the invention.

1. Configuration and the Like of Contents Distribution System

Firstly, a description will be given of an outline configuration and the like of a contents distribution system S, referring to FIGS. 1 to 3.

Figure 1:
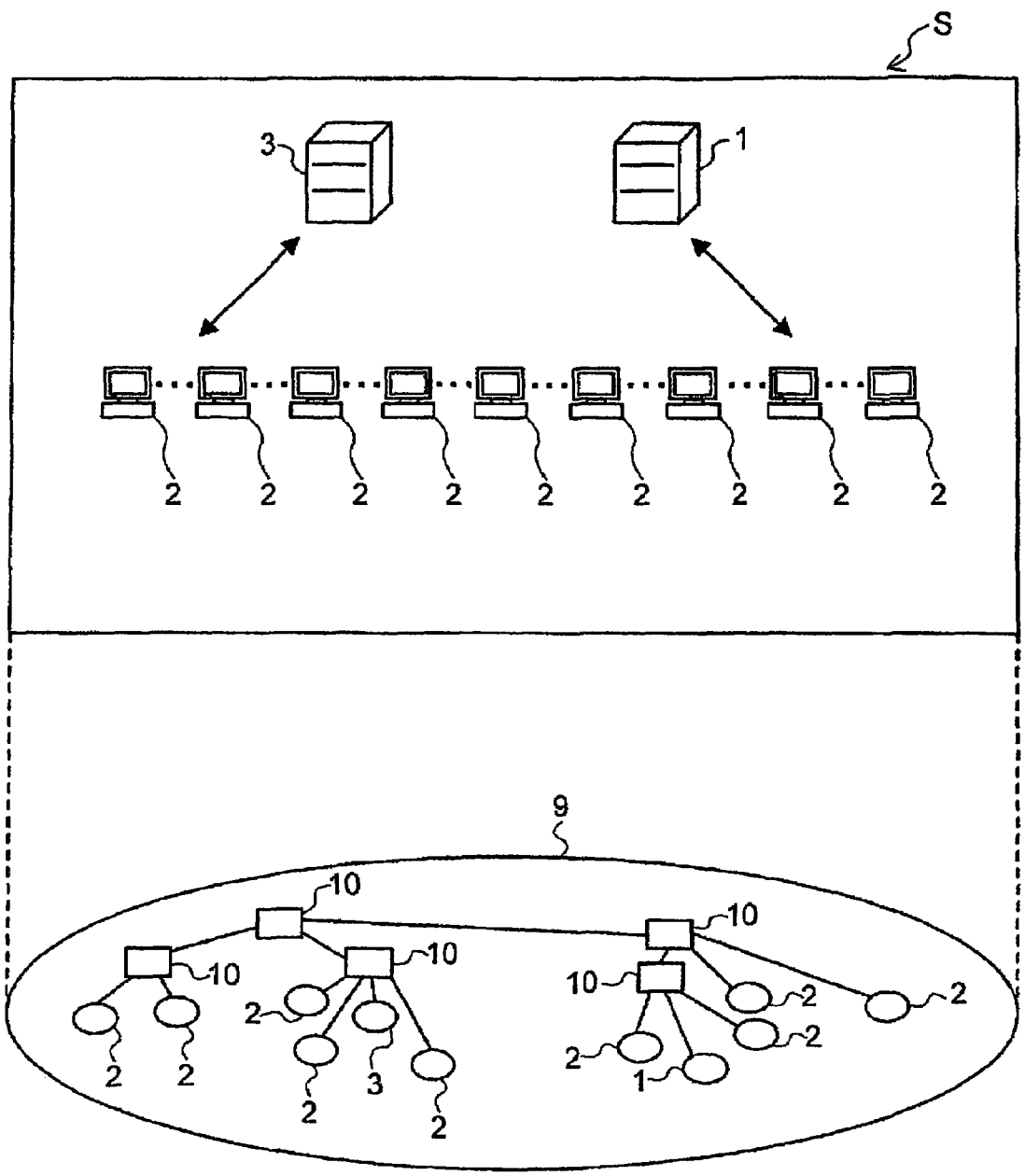
FIG. 1 is a diagram showing an outline configuration example of a contents distribution system S according to an embodiment of the invention.

FIG. 1 is a diagram showing an outline configuration example of the contents distribution system S according to the embodiment. As shown in FIG. 1, the contents distribution system S according to the embodiment is a system which carries out a contents distribution service, which carries out a distribution of contents data (hereafter referred to as "contents") such as music, a movie or a talk show, via a network such as an internet 9.

The contents distribution system S is configured including a contents distribution apparatus 1, which distributes the contents data via the network such as the internet 9, a plurality of terminal apparatus 2, which carry out a reception and a reproduction of the contents data via the network such as the internet 9, and a connection management apparatus 3, which manages a connection condition in the contents distribution system S of various kinds of apparatus, such as the contents distribution apparatus 1 and the plurality of terminal apparatus 2.

In the embodiment, the contents distribution system S being a system including the contents distribution apparatus 1, the contents distribution apparatus 1 distributes the contents data streamed. Also, although a plurality of the contents distribution apparatus 1 are disposed in the contents distribution system S, not being limited to this, it is also acceptable that the contents distribution apparatus 1 is disposed as one apparatus. For the sake of convenience, it may happen that all of the plurality of the terminal apparatus are expressed by a reference numeral 2.

An IP address being allotted to each of the contents distribution apparatus 1, the terminal apparatus 2, and the connection management apparatus 3, the apparatus are connected to the internet 9, as an example of the network, via a router 10 or the like. That is, a communication connection is possible by means of transmitting a packet, including a header which makes an IP address of an objective connection destination terminal apparatus a destination IP address, and an IP address of its own apparatus a transmission source IP address.

Although, in the embodiment, a configuration is done with the contents distribution apparatus 1, the connection management apparatus 3 and the like as separate apparatus, not being limited to this, it is also acceptable, for example, to have the connection management apparatus 3 and the like inside the contents distribution apparatus 1. In this case, it is also acceptable not to allot an IP address to the connection management apparatus 3, and it is also acceptable to arrange in such a way that the connection management apparatus 3 shares an IP address with the contents distribution apparatus 1. Also, for example, it is also acceptable that it is a configuration which also includes, apart from the contents distribution apparatus 1 and the connection management apparatus 3, an apparatus which has a separate function.

Figure 2A:
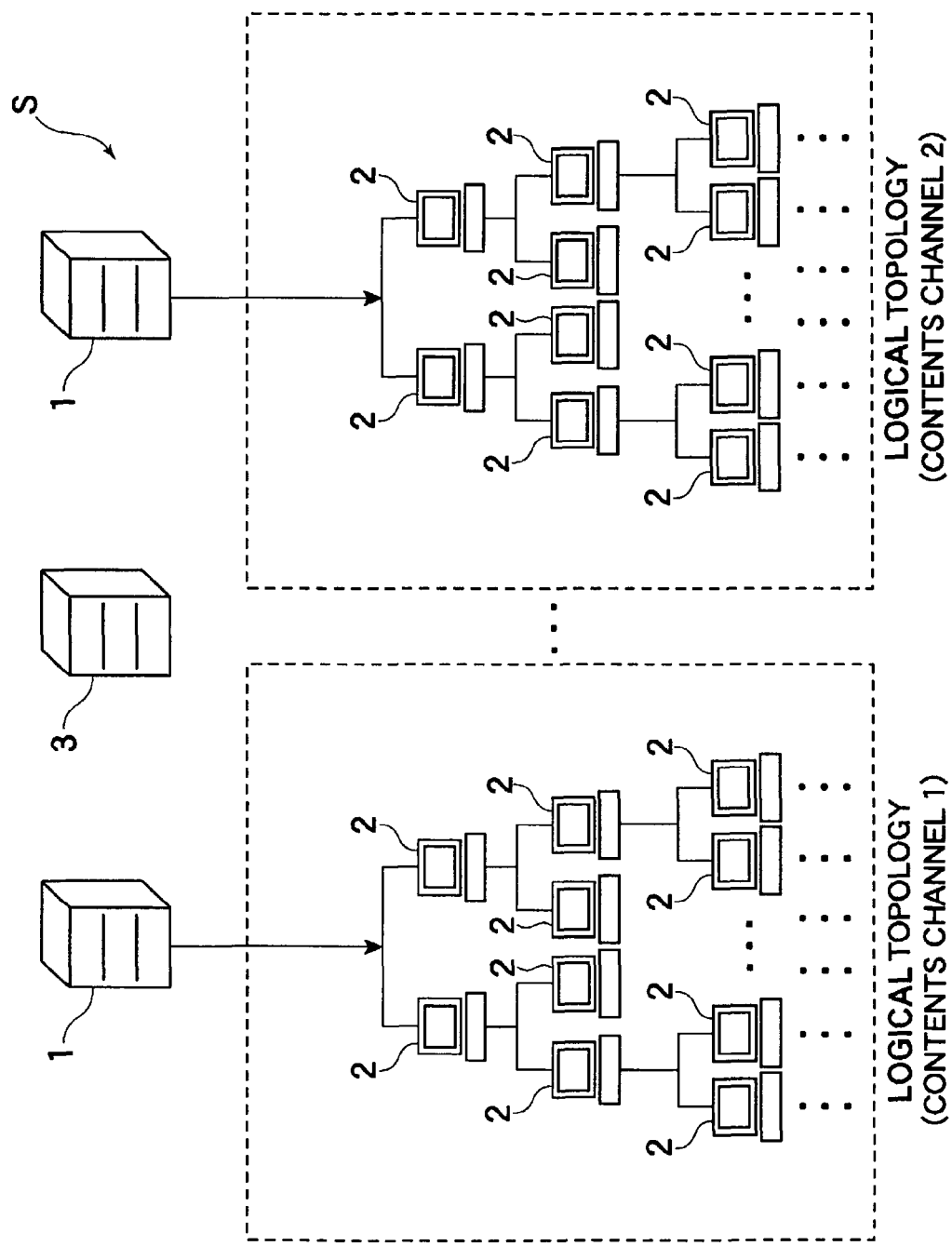
FIGS. 2A and 2B are diagrams showing an outline configuration example of the contents distribution system S according to the embodiment of the invention.

As shown in FIG. 2A, the contents distribution system S is a system which enables a connection of a plurality of the terminal apparatus 2, connected in a multi-leveled hierarchical structure for each of a plurality of contents channels (for example, contents channel 1, contents channel 2 and the like), with the contents distribution apparatus 1 as an apex. Also, although a detailed description will be given hereafter using FIG. 3, the contents distribution system S being a system which enables an introduction of a connection destination when a change of the contents channels is carried out between the plurality of terminals apparatus 2, it is a system with which it is possible to avoid an increase in accesses to the connection management apparatus 3.

Figure 2B:
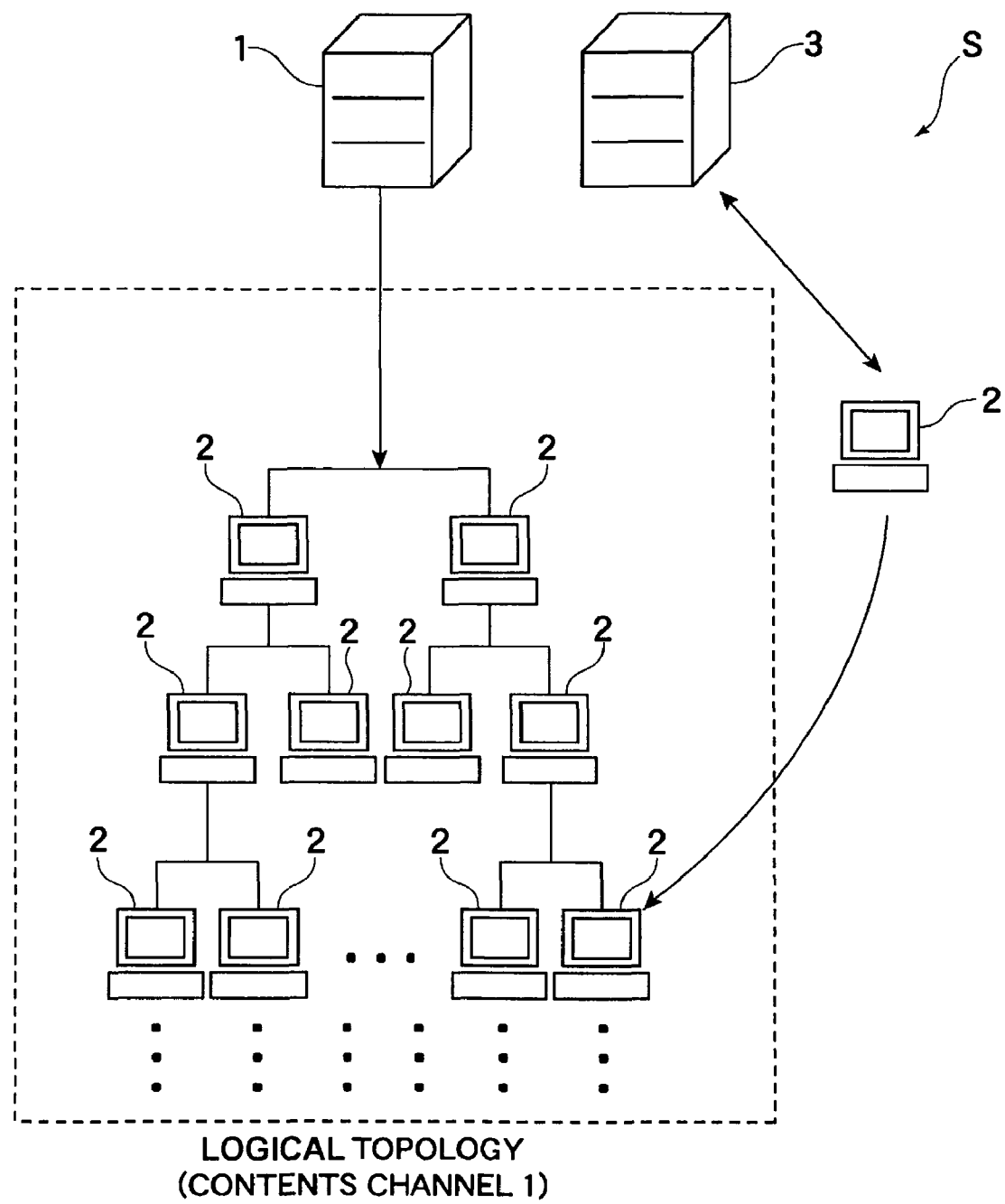

As shown in FIG. 2B, the connection management apparatus 3, on receiving a connection destination introduction request from a terminal apparatus 2 or the like which is not participating in the contents distribution system S, selects a connection destination candidate (the contents distribution apparatus 1 or the like) connecting on an upper level, from which the terminal apparatus 2 receives the streaming distribution, based on a connection condition and the like in the contents distribution system S. Then, the connection management apparatus 3 notifies of location information (an IP address, port number, and the like of the connection destination candidate), communication protocol, and the like, of the connection destination candidate selected in this way.

In the contents distribution system S, when the communication protocol and port number have already been fixed, it is also acceptable not to notify the terminal apparatus 2 of the port number and communication protocol. Herein, an MMS (Microsoft Media Server) protocol, an RTSP (Real Time Streaming Protocol), or the like, is used as the communication protocol. Also, an ASF (Advanced Streaming Format), a WMA (Windows (registered trademark) Media Audio), a WMV (Windows (registered trademark) Media Video), or the like, is used as a format of the contents data.

The terminal apparatus 2, on receiving the location information of the connection destination candidate from the connection management apparatus 3, asks the communication candidate with the IP address for a participation in (a connection to) the contents distribution system S, by which means the terminal apparatus 2 is embedded in the contents distribution system S. That is, the terminal apparatus 2 becomes able to receive the contents data distributed from the contents distribution apparatus 1.

Also, in the event that the terminal apparatus 2 has already participated in the contents distribution system S, when changing the contents channel, it makes a connection destination introduction request for an introduction of a connection candidate to another terminal apparatus 2, prior to the connection management apparatus 3. The terminal apparatus 2 storing a terminal apparatus to which it has previously been connected for each contents channel in which it has participated, it can make the connection destination introduction request to a terminal apparatus which may even now be participating in the contents channel to which the change has been instructed, and acquire the connection destination candidate. In the event that the connection destination candidate cannot be acquired, such as in the event that the terminal apparatus 2 cannot find a terminal apparatus which has previously participated in the contents channel to which the change has been instructed, or in the event that the connection destination introduction request has been made, but no connection destination candidate has been transmitted, the terminal apparatus 2 makes the connection destination introduction request to the connection management apparatus 3, in the same way as in the case heretofore described.

In the contents distribution system S, the plurality of the terminal apparatus 2 are connected, with the contents distribution apparatus 1 as the apex, by the terminal apparatus 2 participating in this way. Then, the contents data distributed from the contents distribution apparatus 1 are distributed streamed to the plurality of the terminal apparatus 2.

As well as the data of contents such as the music and the movie, information on a reproduction time (hereafter referred to as "reproduction time data") is included in the contents data distributed to the terminal apparatus 2 in this way. Then, the plurality of the terminal apparatus 2 which receive the contents data can sequentially carry out the reproduction of the transmitted contents data, based on the reproduction time data.

By this means, in the contents distribution system S, the contents data transmitted from the contents distribution apparatus 1 are distributed streamed to the plurality of the terminal apparatus 2, and it is possible to reproduce the contents at the same time in the plurality of the terminal apparatus 2. That is, a broadcast format streaming distribution to the plurality of the terminal apparatus 2 is realized, using the P2P.

Figure 3:
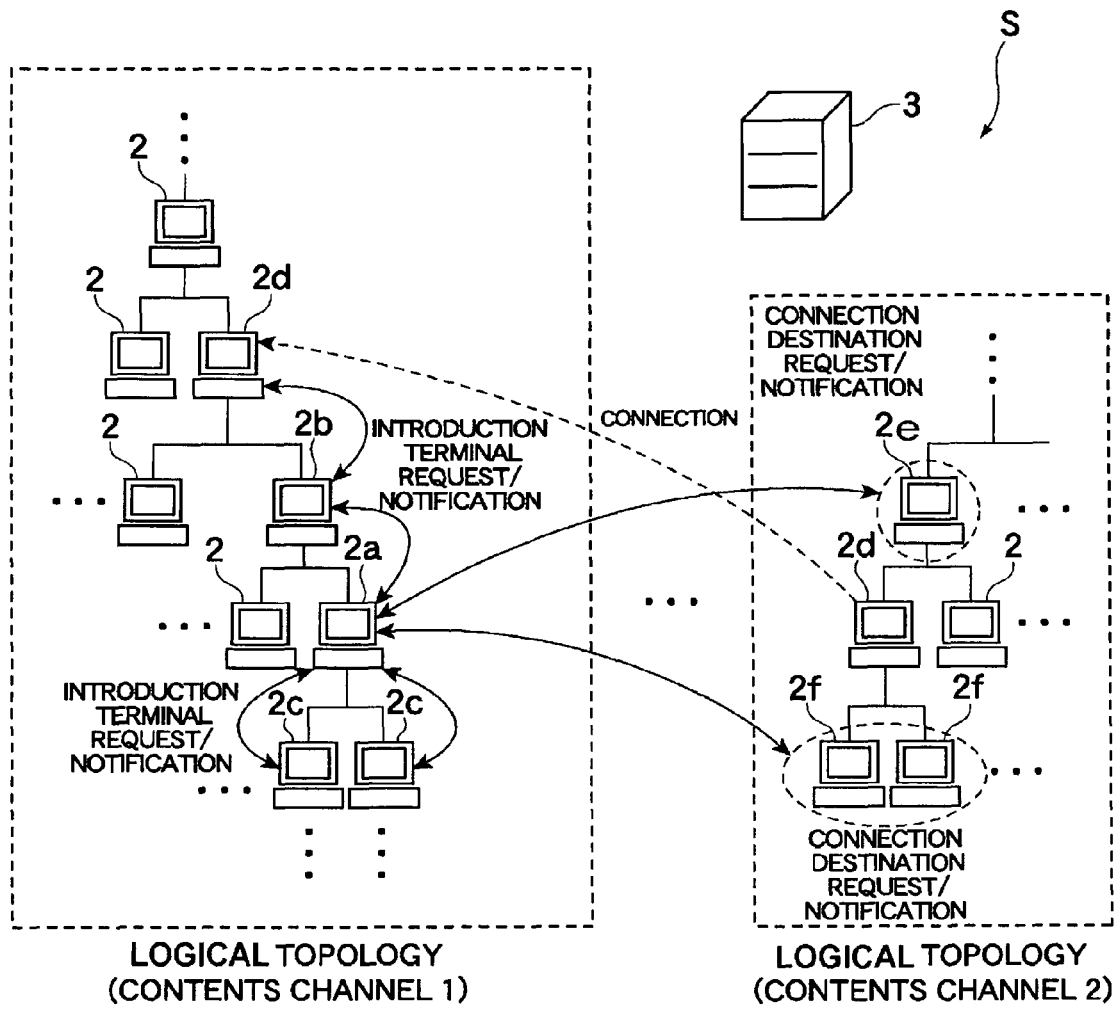
FIG. 3 is a diagram showing an outline configuration example of the contents distribution system S according to the embodiment of the invention.

To give a specific example of the introduction of the connection destination candidate between the terminal apparatus 2, as shown in FIG. 3, in the event that an instruction to change from the contents channel 1 to the contents channel 2 has been issued in a terminal apparatus 2a, which is participating in the contents channel 1, it is determined whether or not the terminal apparatus 2a itself has previously participated in the contents channel 2 and, in the event that it has participated in the contents channel 2, an introduction of a connection destination candidate is requested of any one among terminal apparatus which have been connected on an upper level and a lower level at a time of the participation. Also, in the terminal apparatus 2a, in the event that it has not participated in the contents channel 2, a request to search for a terminal apparatus, which causes an introduction of a connection destination candidate, is made to a terminal apparatus 2b, which is connected on an upper level in the contents channel 1 in which the terminal apparatus 2a is currently participating, and to terminal apparatus 2c, which are connected on a lower level. A kind of the contents channel for which the change instruction has been issued, and a relay node quantity indicating a quantity of terminal apparatus which have been relayed, are included in the search request.

In a terminal apparatus which acquires the search request (for example, the terminal apparatus 2b or the like) too, it is determined whether or not it has previously participated in the contents channel 2, which is included in the acquired search request. Then, in the event that it has previously participated in the contents channel 2, terminal apparatus which have been connected on an upper level and a lower level at a time of the participation are reported to the terminal apparatus 2a, in which the change of the contents channel has been instructed. Identification information (for example, an IP address, a port number and the like) of the terminal apparatus which have been connected to the contents channel 2, and a connection period (times) for which they have been connected, are included in the report, as a response to the search request. Meanwhile, in the event that the terminal apparatus 2b has not previously participated in the contents channel 2, the search request is relayed to a terminal apparatus 2d, which is connected on an upper level and a lower level. This kind of relay of the search request is carried out until the relay node quantity reaches a maximum quantity. For example, in the event that the terminal apparatus 2d has previously participated in the contents channel 2, a terminal apparatus 2e, which has been connected on an upper level at a time of the participation, and terminal apparatus 2f, which have been connected on a lower level, are reported to the terminal apparatus 2a via the terminal apparatus 2b.

Then, in the terminal apparatus 2a which receives the response to the search request, a terminal apparatus, among the plurality of the terminal apparatus, which has a most recent connection period is selected, and a connection destination introduction request for causing an introduction of a connection destination candidate is made to that terminal apparatus. Then, in the terminal apparatus 2e and 2f, which receive the connection destination introduction request, it is determined whether or not the terminal apparatus 2e and 2f themselves are currently participating in the contents channel 2 and, in the event that they are participating in the contents channel 2, a terminal apparatus which is in a condition in which the terminal apparatus 2a can be connected thereto is sought from among the terminal apparatus which are participating in the contents channel 2, and a terminal apparatus to which the connection is possible (for example, the terminal apparatus 2f or the like) is reported to the terminal apparatus 2a as the connection destination candidate. By this means, the terminal apparatus 2a, which receives the report of the connection destination candidate, connects to the connection destination candidate. In the event that the connection destination candidate cannot be acquired, a request which causes the connection management apparatus 3 to introduce a connection destination is made in the terminal apparatus 2a. By this means, it is possible to reduce a likelihood of the terminal apparatus 2a accessing the connection management apparatus 3.

2. Description of Configuration and the Like of Contents Distribution Apparatus 1

Next, a description will be given of a configuration and operations of the contents distribution apparatus 1, referring to FIG. 4.

FIG. 4 is a diagram showing an outline configuration example of the contents distribution apparatus 1 in the embodiment. The contents distribution apparatus 1, to which a general server computer is applicable, being configured, as shown in FIG. 4, including a CPU (Central Processing Unit) 102, a rewritable main memory 105, which stores various kinds of program and the like, a hard disc device 103, which stores various kinds of data and the like, a network interface 104, which carries out communication with the terminal apparatus 2 and the connection management apparatus 3 via the internet 9, a peripheral equipment control chip 106, which controls an input device capable of inputting predetermined information, such as a keyboard 107 or a mouse 108, a video chip 109 which, as well as receiving image data from the CPU 102 and writing them into an internal video memory (not shown), displays the data written into the video memory on a built-in display 110, to be described hereafter, the built-in display 110, which carries out a display in accordance with a signal transmitted from the video chip 109, a sound source chip 111, which has a sound source such as an FM (Frequency Modulation) sound source or a Wave Table sound source, and a built-in speaker 112, which converts an audio signal transmitted from the sound source chip 111 into a sound wave, these various kinds of component are mutually connected via a system bus 101.

The network interface 104 is connected to the internet 9 via a router 10a. The router 10a corresponds to the router 10 shown in FIG. 1.

In the embodiment, a controller 130 is configured of the CPU 102 and the main memory 105. Also, the built-in display (a liquid crystal display or the like) 110 or the like being built into the contents distribution apparatus 1, as heretofore described, it is possible, for example, for a broadcaster who operates the contents distribution system S to input the predetermined information with the input device while looking at the built-in display 110. Although, in the embodiment, the built-in display 110, the built-in speaker 112 and the like are built into the contents distribution apparatus 1, not being limited to this, it is also acceptable, for example, that they are connected separately.

Main Memory 105

An OS (Operating System) program 117 for providing basic functions of the contents distribution apparatus 1 as a computer, a stream control program 115 for retrieving contents data stored in the hard disc device 103, and distributing them streamed to a terminal apparatus 2, a topology management program 116 for carrying out management and the like of location information (an IP address, a port number and the like) of each terminal apparatus 2 connected on a lower level, a screen control program 118 for controlling the built-in display 110, a decoder program 119 for decoding encoded contents data, a ring buffer 120, which temporarily stores contents data retrieved from contents data 113, stored in the hard disc device 103, before transmitting them to a terminal apparatus 2, and the like being stored in the main memory 105, they are retrieved by the CPU 102, and functions according to the programs are executed by the CPU 102.

Herein, the OS program 117, by being retrieved and executed by the CPU 102, renders executable functions relating to an input and output of the keyboard 107 and mouse 108, and the basic functions of the computer, which is the contents distribution apparatus 1, such as a memory management and the like of the main memory 105, the hard disc device 103, and the like.

Then, in a condition in which the OS program 117 is executed by the CPU 102, the heretofore described stream control program 115, topology management program 116, screen control program 118, and decoder program 119 are retrieved from the main memory 105, and executed.

In particular, in the embodiment, a contents management program 121, which manages distribution information and the like of the contents data, being stored in the main memory 105, it is retrieved by the CPU 102, and functions according to the program are executed by the CPU 102.

Then, in a condition in which the OS program 117 is executed by the CPU 102, the heretofore described contents management program 121 is retrieved from the main memory 105, and executed.

It is also acceptable that the OS program 117, stream control program 115, topology management program 116, screen control program 118, decoder program 119, contents management program 121 and the like are, for example, downloaded into the main memory 105 from a server, or the like, connected to the internet 9, and it is also acceptable that, after being recorded on a recording medium such as a CD-ROM, they are written into the main memory 105 via a drive of the recording medium.

Controller 130

The controller 130, being configured, as heretofore described, of the CPU 102 and main memory 105, centrally controls a whole of the contents distribution apparatus 1 by the CPU 102 retrieving and executing the various kinds of program 115 to 119, and 121, stored in the main memory 105, as well as functioning as a contents data distribution unit, and the like, to be described hereafter. The controller 130 functions as the contents data distribution unit, and the like, by means of the CPU 102 executing the stream control program 115, also, as a topology management unit, by means of the CPU 102 executing the topology management program 116, also, as a display control unit and the like, by means of the CPU 102 executing the screen control program 118, as a reproduction unit, by means of the CPU 102 executing the decoder program 119, and as a distribution contents management unit, by means of the CPU 102 executing the contents management program 121. Furthermore, the hard disc device 103 is used as a contents data storage unit, in which are stored contents data, and a distribution time corresponding to the contents data.

Distribution Contents Management Unit

The distribution contents management unit carries out management of the contents data stored in the hard disc device 103, and of distribution information corresponding to the contents data.

Contents Data Distribution Unit

The contents data distribution unit, by means of an input device such as the keyboard 107, or by it being determined that a set distribution time has been reached, retrieves specified contents data from the distribution contents data 113 stored in the hard disc device 103, and distributes them streamed to a connected terminal apparatus 2 (for example, in a case of being connected in a tree shape, a terminal apparatus on an uppermost level), or the like, via the network interface 104.

The streaming distribution to the terminal apparatus 2, or the like, by the contents data distribution unit is executed by the following procedure.

The contents data distribution unit sequentially retrieves contents data, corresponding to preset contents, from the distribution contents data 113 stored in advance in the hard disc device 103, and stores them in the ring buffer 120.

Next, the contents data distribution unit encodes contents data retrieved from the ring buffer 120 into a streaming distribution data format, for example, a data format such as the ASF, the WMA or the WMV.

Subsequently, the contents data distribution unit makes the corresponding contents data into contents packets, while dividing them into units of a predetermined capacity, and transmits the contents packets to the connected terminal apparatus 2 or the like, via the network interface 104.

Topology Management Unit

In the contents distribution apparatus 1, one channel being allocated to one contents distribution apparatus 1, the topology management unit manages location information (an IP address, a port number and the like) of a terminal apparatus 2 participating in a first level of a tree-shaped hierarchical structure configured in the allocated channel. Then, the heretofore described distribution unit carries out a transmission of contents data to the terminal apparatus 2 with the IP address of the terminal apparatus 2 which the topology management unit manages as a destination address, and a distribution IP address as a transmission source.

Display Control Unit

The display control unit has a function of controlling the video chip 109 and the built-in display 110, and displaying the contents data and various kinds of information. That is, the display control unit can control in what way images of the contents and the various kinds of information are displayed on the built-in display 110.

Reproduction Unit

The reproduction unit has functions of displaying contents data, from among the distribution contents data 113, on the built-in display 110, and transmitting them from the built-in speaker 112.

3. Description of Configuration and the Like of Terminal Apparatus 2

Next, a description will be given of a configuration and operations of the terminal apparatus 2, referring to FIG. 5.

FIG. 5 is a diagram showing an outline configuration example of the terminal apparatus 2 in the embodiment. The terminal apparatus 2, to which a general personal computer or a designated terminal are applicable, being configured, as shown in FIG. 5, including a CPU (Central Processing Unit) 202, a rewritable main memory 205, which stores various kinds of program and the like, a hard disc device 203, which stores various kinds of data and the like, a network interface 204, for carrying out communication with the contents distribution apparatus 1, the connection management apparatus 3, and other terminal apparatus 2 on a network, via the internet 9, a user input remote control 208, which transmits and receives a predetermined infrared signal which enables a remote operation by a user of the terminal apparatus 2, an infrared port 207 for carrying out communication with the user input remote control 208 by means of infrared rays, a peripheral equipment control chip 206, which controls the infrared port 207, a video chip 209 which, as well as receiving image data from the CPU 202 and writing them into an internal video memory (not shown), displays the data written into the video memory on a built-in display 210, to be described hereafter, the built-in display 210, which carries out a display in accordance with a signal transmitted from the video chip 209, a sound source chip 211, which has a sound source such as an FM (Frequency Modulation) sound source or a Wave Table sound source, and a built-in speaker 212, which converts an audio signal transmitted from the sound source chip 211 into a sound wave, these various kinds of component are mutually connected via a system bus 201.

In the embodiment, a controller 230 is configured of the CPU 202 and the main memory 205. Also, the network interface 204 is connected to the internet 9 via a router 10b. The router 10b corresponds to the router 10 shown in FIG. 1.

Operations such as a purchase of contents in the contents distribution system S, an acquisition of a contents list, and an instruction to change a contents channel, are possible with the heretofore described kind of user input remote control 208.

Main Memory 205

Also, an OS program 217 for providing basic functions of the terminal apparatus 2 as a computer, a stream control program 215 for receiving streamed, or transmitting streamed to a terminal apparatus 2 on a lower level, contents data distributed streamed, directly from the contents distribution apparatus 1 or relayed through another terminal apparatus 2, a topology control program 216 for carrying out management or the like of location information (an IP address and a port number) of a terminal apparatus 2 (or the contents distribution apparatus 1) on a level one level above connected in a tree structure, and location information of a terminal apparatus 2 on a level one level below connected in the tree structure, a screen control program 218 for controlling the built-in display 210, a decoder program 219 for decoding and reproducing contents data received streamed from the upper level terminal apparatus, a ring buffer 220 which, as well as sequentially storing the contents data received streamed, sequentially deletes contents data, among the stored contents data, for which a reproduction is complete and, in the event that there exists another terminal apparatus 2 connected on the lower level, contents data for which a distribution to that terminal apparatus 2 is complete, and the like being stored in the main memory 205, they are retrieved by the CPU 202, and functions according to the programs are executed by the CPU 202.

Herein, the OS program 217, by being retrieved and executed by the CPU 202, renders executable functions relating to an input and output of the user input remote control 208, and the basic functions of the computer, which is the terminal apparatus 2, such as a memory management of the main memory 205, the hard disc device 203, and the like. Then, in a condition in which the OS program 217 is executed by the CPU 202, the heretofore described stream control program 215, topology control program 216, screen control program 218, decoder program 219, and the like, are retrieved from the main memory 205, and executed.

In particular, in the embodiment, a connection history management program 221, which stores a history of terminal apparatus and the like which have been connected, a contents change program 222, which changes contents channels, a terminal apparatus search program 223, which searches for a terminal apparatus which will cause an introduction of a connection destination, and a connection destination introduction program 224, which introduces a connection destination, being stored in the main memory 205, they are retrieved by the CPU 202, and functions according to the programs are executed by the CPU 202.

Then, in a condition in which the OS program 217 is executed by the CPU 202, the heretofore described connection history management program 221, contents change program 222, terminal apparatus search program 223, and connection destination introduction program 224 are retrieved from the main memory 205, and executed.

It is also acceptable that the OS program 217, stream control program 215, topology control program 216, screen control program 218, decoder program 219, connection history management program 221, contents change program 222, terminal apparatus search program 223, connection destination introduction program 224, and the like are, for example, downloaded into the main memory 205 from a server, or the like, connected to the internet 9, and it is also acceptable that, after being recorded on a recording medium such as a CD-ROM, they are loaded into the main memory 205 via a drive of the recording medium.

Controller 230

The controller 230, being configured, as heretofore described, of the CPU 202 and main memory 205, centrally controls a whole of the terminal apparatus 2 by the CPU 202 retrieving and executing the various kinds of program 215 to 219, and 221 to 224, stored in the main memory 205, as well as functioning as a contents reception unit, a contents data relay control unit, a connection destination candidate request unit (corresponding to one example of a second connection destination candidate request unit), a first connection destination candidate request unit, a connection destination candidate reception unit, a connection unit, a reproduction unit, a connection terminal apparatus storage unit, a terminal apparatus storage determination unit, a contents channel change determination unit, a connection destination candidate introduction terminal apparatus selection unit, a terminal apparatus inquiry unit, a terminal apparatus reception unit, a terminal apparatus inquiry reception unit, a terminal apparatus notification unit, an inquiry level quantity counting unit, an inquiry level quantity determination unit, a contents channel connection determination unit, a connection determination unit, a connection possible terminal apparatus inquiry unit, a connection destination candidate selection unit (corresponding to one example of a second connection destination candidate selection unit), a connection destination candidate notification unit (corresponding to one example of a second connection destination candidate notification unit), and the like, to be described hereafter. Furthermore, a connection history table, to be described in detail hereafter, being stored in the hard disc device 203, the hard disc device 203 is also used as a connection terminal apparatus storage unit, which stores previously connected terminal apparatus correlated to a contents channel and a connection time.

The controller 230 functions as the contents reception unit and the contents data relay control unit, by the CPU 202 executing the stream control program 215, also, as the connection destination candidate request unit, the first connection destination candidate request unit, the connection destination candidate reception unit, the connection unit and the like, by the CPU 202 executing the topology control program 216, also, as a display control unit and the like, by the CPU 202 executing the screen control program 218, furthermore, as the reproduction unit and the like, by the CPU 202 executing the decoder program 219, furthermore, as the connection terminal apparatus storage unit, the terminal apparatus storage determination unit and the like, by the CPU 202 executing the connection history management program 221, furthermore, as the contents channel change determination unit, the connection destination candidate introduction terminal apparatus selection unit, the terminal apparatus inquiry unit, the terminal apparatus reception unit and the like, by the CPU 202 executing the contents change program 222, furthermore, as the terminal apparatus inquiry reception unit, the terminal apparatus notification unit, the inquiry level quantity counting unit, the inquiry level quantity determination unit and the like, by the CPU 202 executing the terminal apparatus search program 223, and furthermore, as the contents channel connection determination unit, the connection determination unit, the connection possible terminal apparatus inquiry unit, the connection destination candidate selection unit, the connection destination candidate notification unit and the like, by the CPU 202 executing the connection destination introduction program 224.

The connection terminal apparatus storage unit stores terminal apparatus 2 previously connected on an upper level and a lower level as the connection history table, to be described hereafter, correlated to a contents channel and a connection time. In particular, the connection terminal apparatus storage unit stores a connection severance time, at which the connection has been severed, as the connection time.

The terminal apparatus storage determination unit determines whether or not a terminal apparatus, among the terminal apparatus previously connected on the upper level and the lower level, corresponding to a contents channel for which a change instruction has been issued, is stored. In particular, the terminal apparatus storage determination unit, in the event that an instruction to change the contents channel has been issued, or in the event that an inquiry for a terminal apparatus corresponding to the contents channel has been received from another terminal apparatus 2, determines whether or not a terminal apparatus, among the terminal apparatus previously connected on the upper level and the lower level, corresponding to that contents channel is stored.

The contents channel change determination unit determines whether or not a change instruction, causing a change of contents channel, has been issued.

The terminal apparatus inquiry unit, in the event that an instruction to change the contents channel has been issued, or in the event that an inquiry for a terminal apparatus corresponding to the contents channel for which the change instruction has been issued has been received from another terminal apparatus 2, when it is determined that no terminal apparatus corresponding to the contents channel for which the change instruction has been issued is stored, makes an inquiry to another terminal apparatus, connected on the upper level or lower level, for a terminal apparatus corresponding to the contents channel for which the change instruction has been issued. In particular, the terminal apparatus inquiry unit, on a condition that it is determined that an inquiry level quantity has not reached more than a predetermined quantity, makes an inquiry to another terminal apparatus, connected on the upper level or lower level, for a terminal apparatus corresponding to a predetermined contents channel or, on a condition that it is determined that the inquiry level quantity has reached more than the predetermined quantity, carries out a control forbidding the inquiry to the other terminal apparatus.

The inquiry level quantity counting unit counts a level quantity of inquiries made for a terminal apparatus corresponding to the contents channel. The inquiry level quantity determination unit determines whether or not the counted inquiry level quantity has reached more than the predetermined quantity.

The terminal apparatus inquiry reception unit receives an inquiry from another terminal apparatus for a terminal apparatus corresponding to the predetermined contents channel. The terminal apparatus notification unit, in the event of receiving an inquiry for a terminal apparatus corresponding to the predetermined contents channel, when it is determined that a terminal apparatus corresponding to the predetermined contents channel is stored, notifies the terminal apparatus which has made the inquiry for the terminal apparatus. The terminal apparatus reception unit receives the terminal apparatus corresponding to the contents channel, for which the inquiry has been made.

The connection destination candidate introduction terminal apparatus selection unit selects, from other connected terminal apparatus, or terminal apparatus, stored in the terminal apparatus itself, which have previously been connected, a terminal apparatus corresponding to the contents channel for which a change has been instructed as a connection destination candidate introduction terminal apparatus, which causes an introduction of a connection destination candidate. In particular, the connection destination candidate introduction terminal apparatus selection unit, in the event that it is determined that a terminal apparatus corresponding to the contents channel for which a change has been instructed is stored, selects that terminal apparatus as a connection destination candidate introduction terminal apparatus and, in the event that it is determined that no terminal apparatus corresponding to the contents channel for which a change has been instructed is stored, selects a terminal apparatus corresponding to the contents channel received from another terminal apparatus 2 as a connection destination candidate introduction terminal apparatus. Also, the connection destination candidate introduction terminal apparatus selection unit, in the event that there is a plurality of terminal apparatus corresponding to the contents channel for which a change has been instructed, selects a terminal apparatus, from the plurality of terminal apparatus, of which a connection time is most recent as a connection destination candidate introduction terminal apparatus.

The connection destination introduction request unit, in order to cause a terminal apparatus 2 to participate in the contents distribution systems, or in order to change a contents channel to which the terminal apparatus 2 is connected, transmits a connection destination introduction request in order to receive contents data, in response to a purchasing operation of the user input remote control 208, an operation instructing a change of the contents channel (a selection operation), or the like, by the user. The connection destination introduction request unit includes a first connection destination introduction request unit, which transmits the connection destination introduction request to the connection management apparatus 3, and a second connection destination introduction request unit, which transmits the connection destination introduction request to another terminal apparatus 2. In particular, the connection destination introduction request unit, in the event that a change instruction operation of the user input remote control 208 is carried out by the user, requests from the other terminal apparatus 2 a connection destination candidate corresponding to the contents channel for which the change instruction has been issued (functioning as the second connection destination introduction request unit) and, in the event that no connection destination candidate is received in response to the request, or in the event that it is not possible to make the actual request, requests from the connection management apparatus 3 a connection destination candidate corresponding to the contents channel for which the change instruction has been issued (functioning as the first connection destination introduction request unit).

The contents channel connection determination unit, in the event that a connection destination candidate is requested by another terminal apparatus 2, determines whether or not the terminal apparatus 2 of which the connection destination candidate is requested is itself a terminal apparatus corresponding to the contents channel in the request.

The connection determination unit, in the event that a connection destination candidate is requested by another terminal apparatus 2, when it is determined that the terminal apparatus 2 of which the connection destination candidate is requested is itself a terminal apparatus corresponding to the contents channel in the request, determines whether or not it is possible to connect to the actual terminal apparatus 2 of which the connection destination candidate is requested. The connection possible terminal apparatus inquiry unit, in the event that it is determined that it is not possible to connect to the actual terminal apparatus 2 of which the connection destination candidate is requested, makes an inquiry of a terminal apparatus 2 on an upper level or a lower level for a terminal apparatus to which a connection is possible.

The connection destination candidate selection unit, in the event that it is determined that it is possible to connect to the actual terminal apparatus 2 of which the connection destination candidate is requested, selects the actual terminal apparatus 2 of which the request has been made as the requested connection destination candidate corresponding to the contents channel. Also, the connection destination candidate selection unit, based on a result of the inquiry for the terminal apparatus to which the connection is possible, selects a terminal apparatus to which the connection is possible as the requested connection destination candidate corresponding to the contents channel. The connection destination candidate notification unit notifies the other terminal apparatus 2, which has requested the connection destination candidate, of the selected connection destination candidate.

The connection destination candidate reception unit receives the connection destination candidate corresponding to the connection destination introduction request from another terminal apparatus 2 or the connection management apparatus 3. In particular, the connection destination candidate reception unit, in the event that there has been an instruction for a change of contents channel, receives a connection destination candidate corresponding to the contents channel from another terminal apparatus 2 or the connection management apparatus 3. The connection unit connects, via the network, to the heretofore described connection destination candidate (in the event that there is a plurality of connection destination candidates, any one of the connection destination candidates) received by the connection destination candidate reception unit, such as the contents distribution apparatus, or another terminal apparatus.

The contents reception unit receives contents data, via the network interface 204, from the contents distribution apparatus 1 or a terminal apparatus 2 connected on an upper level.

The reproduction unit has a function of sequentially storing the contents data received streamed by the network interface 204 in the ring buffer 220, and sequentially reproducing them. Also, in the event of reproducing purchased data, the reproduction unit has a function of acquiring contents data from the hard disc device 203, and reproducing them.

The reproduction unit realizing these functions by causing the sound source chip 211 and the video chip 209 to operate, sequentially retrieves the contents data stored in the ring buffer 220, converts them into a predetermined contents data format (for example, the Wave format), inputs them into the sound source chip 211 and the video chip 209, and carries out a reproduction of the contents.

In the event that the contents data converted into the predetermined contents data format by the reproduction unit include audio information, after the audio information is converted into an audio signal by the sound source chip 211, it is transmitted from the built-in speaker 212.

Also, when video information is included in the contents data converted into the predetermined contents data format by the reproduction unit, the video information is displayed on the built-in display 210 by means of a control by the display control unit, to be described hereafter.

Also, the reproduction unit, based on reproduction starting time information included in the contents data stored in the ring buffer 220, decides a timing of reproducing the contents data. That is, the reproduction unit is configured in such a way as to transmit the contents data stored in the ring buffer 220 to the built-in speaker 212 and the built-in display 210 at the reproduction starting time.

The display control unit has a function of controlling the video chip 209 and the built-in display 210, and displaying the contents data and various kinds of information. That is, the display control unit can control in what way to display images of the contents, and the various kinds of information, on the built-in display 210.

Also, in particular, the contents data relay control unit forwards the contents data received, via the network interface 204, from the contents distribution apparatus 1, or a terminal apparatus 2 connected on the upper level, to another terminal apparatus 2 connected on a lower level, via the network interface 204.

A description will be given, using FIG. 6, of the connection history table stored in the hard disc device 203 in the terminal apparatus 2 with the heretofore described kind of configuration. Even in the event that the connection history table to be described hereafter is not stored in the hard disc device 203 in the terminal apparatus 2, it is sufficient that data and programs having this kind of function are stored in the hard disc device 203, or the like, in the terminal apparatus 2.

The connection history table stored in the hard disc device 203 in the terminal apparatus 2 is for storing terminal apparatus to which the terminal apparatus 2 has previously been connected on an upper level and a lower level. As shown in FIG. 6, a connection severance time and date, indicating a time and date of a severance of a connection, a contents channel to which the terminal apparatus 2 has been connected, and identification information of terminal apparatus connected on an upper level and a lower level (for example, an IP address, a port number and the like), are stored correlated in the connection history table. In the terminal apparatus 2, by the connection history table being referred to, it is possible to ascertain the terminal apparatus to which the terminal apparatus 2 has previously been connected, connected contents channels, and the time at which the connection has been severed.

The hard disc device 203 in which this kind of connection history table is stored, and the controller 230 which carries out a storage control thereof, functioning as the connection terminal apparatus storage unit, store a connection time, correlated to the terminal apparatus to which the terminal apparatus 2 has previously been connected, and to the contents channel of that terminal apparatus, at which the terminal apparatus 2 has previously been connected.

Although, in the embodiment, the connection severance time, at which the connection is severed, is stored at a time when the connection is severed, not being limited to this, it is also acceptable, for example, to store a time at which the connection is made. Also, it is also acceptable, for example, to store the time at which the connection is made at the time when the connection is made.

4. Description of Configuration and the Like of Connection Management Apparatus 3

Next, a description will be given of a configuration and operations of the connection management apparatus 3, referring to FIG. 7.

Figure 7:
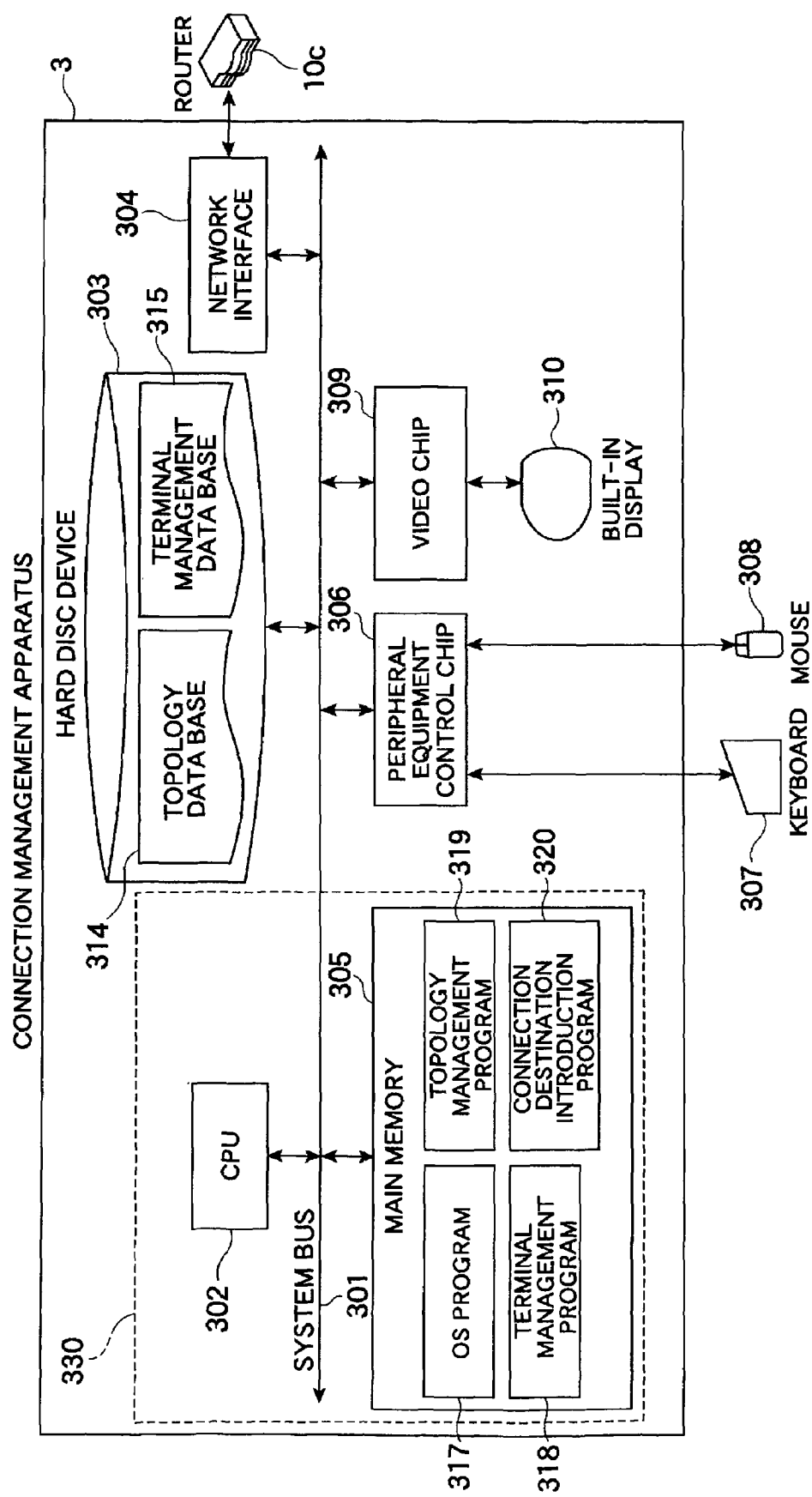
FIG. 7 is a functional block diagram showing a connection management apparatus.

FIG. 7 is a diagram showing an outline configuration example of the connection management apparatus 3 in the embodiment. The connection management apparatus 3, to which a general server computer is applicable, being configured, as shown in FIG. 7, including a CPU (Central Processing Unit) 302, a rewritable main memory 305, which stores various kinds of program and the like, a hard disc device 303, which stores various kinds of data and the like, a network interface 304, which carries out communication with the contents distribution apparatus 1 and terminal apparatus 2 via the internet 9, a peripheral equipment control chip 306, which controls an input device capable of inputting predetermined information, such as a keyboard 307 or a mouse 308, and a video chip 309 which, as well as receiving image data from the CPU 302 and writing them into an internal video memory (not shown), displays the data written into the video memory on a built-in display 310, these various kinds of component are mutually connected via a system bus 301.

In the embodiment, a controller 330 is configured of the CPU 302 and the main memory 305. The network interface 304 is connected to the internet 9 via a router 10*c*. The router 10*c* corresponds to the router 10 shown in FIG. 1.

Main Memory 305

Also, an OS program 317 for providing basic functions of the connection management apparatus 3 as a computer, a terminal management program 318 for managing location information (an IP address, a port number and the like) and the like of a plurality of terminal apparatus 2 connected to a channel, a topology management program 319 for, for example, constructing and managing a tree-shaped hierarchical structure of each channel, a connection destination introduction program 320 which, for example, selects a connection destination candidate of a channel corresponding to a connection destination introduction request transmitted from a terminal apparatus 2, and transmits information on the connection destination candidate to the terminal apparatus 2, and the like being stored in the main memory 305, they are retrieved by the CPU 302, and functions according to the programs are executed by the CPU 302.

Herein, the OS program 317, by being retrieved and executed by the CPU 302, renders executable functions relating to an input and output of the keyboard 307 and mouse 308, and the basic functions of the computer, which is the connection management apparatus 3, such as a memory management and the like of the main memory 305, the hard disc device 303, and the like. Then, in a condition in which the OS program 317 is executed by the CPU 302, the heretofore described terminal management program 318, topology management program 319, connection destination introduction program 320, and the like are executed.

It is also acceptable that the OS program 317, terminal management program 318, topology management program 319, connection destination introduction program 320, and the like are, for example, downloaded into the main memory 305 from a server, or the like, connected to the internet 9, and it is also acceptable that, after being recorded on a recording medium such as a CD-ROM, they are loaded into the main memory 305 via a drive of the recording medium.

Controller 330

The controller 330, being configured, as heretofore described, of the CPU 302 and main memory 305, centrally controls a whole of the connection management apparatus 3 by the CPU 302 retrieving and executing the various kinds of program 317 to 320 stored in the main memory 305, as well as functioning as a first connection destination introduction request reception unit, a first connection destination candidate selection unit, a first connection destination candidate notification unit, a topology management unit, a terminal management unit, and the like, all to be described hereafter. Furthermore, the hard disc device 303 is used as a connection condition information storage unit, which stores connection condition information of the contents distribution apparatus 1, and of a plurality of the terminal apparatus 2, connected in a multi-leveled hierarchical structure on the network, for each of a plurality of contents channels, with the contents distribution apparatus 1 as an apex.

The controller 330 functions as the terminal management unit, and the like, by the CPU 302 executing the terminal management program 318, also, as the topology management unit, and the like, by the CPU 302 executing the topology management program 319, and furthermore, as the first connection destination introduction request reception unit, first connection destination candidate selection unit, first connection destination candidate notification unit, and the like, by the CPU 302 executing the connection destination introduction program 320.

The terminal management unit, on receiving a registration request from a terminal apparatus 2, registers an IP address and the like, which is location information of the terminal apparatus 2, for each channel in a terminal management database 315. Also, in the event also of receiving a registration request from the contents distribution apparatus 1, the terminal management unit registers an IP address and the like, which is location information of the contents distribution apparatus 1, for each channel in the terminal management database 315. The location information of the terminal apparatus 2 being included in the registration request from the terminal apparatus 2, the terminal management unit acquires the location information from the registration request.

The topology management unit, based on a new channel generation request transmitted from the contents distribution apparatus 1, has a function as a new topology generation unit for generating a tree-shaped hierarchical structure of a new channel, and as a topology change unit, which changes connection information of a terminal apparatus 2 in the channel, in accordance with a connection destination introduction request of a terminal apparatus 2, and a topology fluctuation notification such as a connection severance notification. Also, the topology management unit stores the connection condition information of the contents distribution apparatus 1, and of the plurality of the terminal apparatus 2, connected in the multi-leveled hierarchical structure on the network, for each of the plurality of contents channels, with the contents distribution apparatus 1 as the apex, in a topology database 314 as a connection condition information storage unit.

The new topology generation unit, in the event of generating a new channel, generates a topology table of the new channel, and registers it in the topology database 314. Herein, the topology table being a table which stores, for each channel, connection condition information and the like of terminal apparatus 2 which configure a hierarchical structure, it is generated for each channel, and registered in the topology database 314.

The topology change unit executing a function which adds information on terminal apparatus 2 to, or deletes it from, a plurality of topology tables stored in the topology database 314, it carries out an addition to, or change of, a topology table, based on a connection destination introduction request topology participation report from a terminal apparatus 2.

The first connection destination introduction request reception unit receives a connection destination introduction request transmitted from a terminal apparatus 2, and acquires the connection destination introduction request.

The first connection destination candidate selection unit, when receiving a connection destination introduction request from a terminal apparatus 2 which is trying to newly participate in a channel, selects, in the hierarchical structure of the channel corresponding to the connection destination introduction request, a connection destination candidate, among the terminal apparatus 2 which configure the hierarchical structure, corresponding to the connection destination introduction request, from the connection condition information stored in the topology database 314.

The first connection destination candidate notification unit has a function of notifying the terminal apparatus 2 which has transmitted the connection destination introduction request of the connection destination candidate selected by the first connection destination candidate selection unit. The notification of the connection destination candidate includes information on the connection destination candidate, that is, communication protocol, an IP address, a port number and the like of a terminal apparatus 2 which is the connection destination candidate.

5. Operations of Contents Distribution System S

Hereafter, a more specific description will be given, using flowcharts, of detailed operations of the contents distribution apparatus 1, terminal apparatus 2 and connection management apparatus 3.

Description of Contents Distribution Apparatus 1 Process Flow

Figure 8:
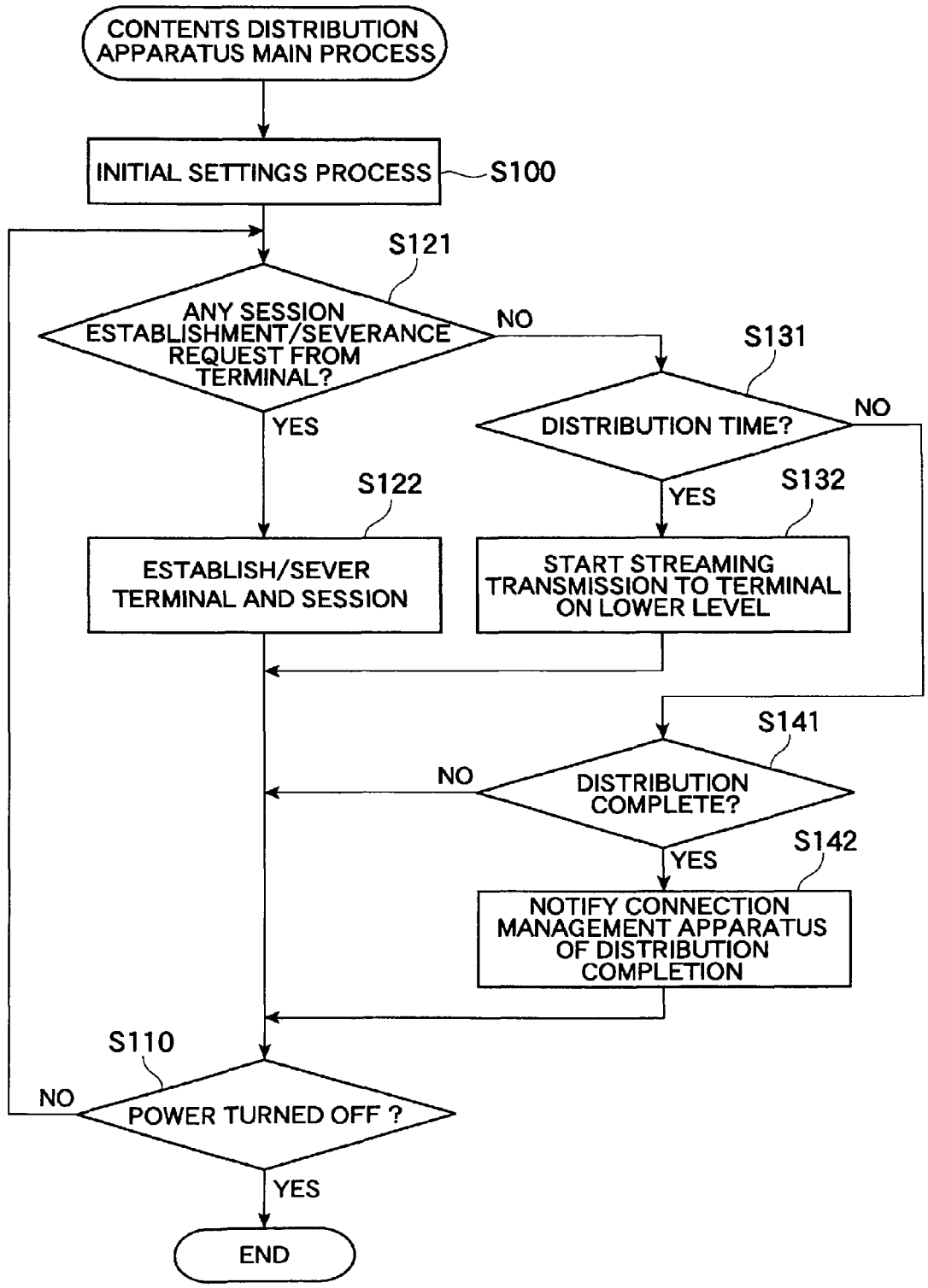
FIG. 8 is a flowchart showing a process carried out by a controller of the contents distribution apparatus.

Firstly, a description will be given, referring to FIG. 8, of more specific operations of the contents distribution apparatus 1. FIG. 8 is a flowchart showing an overall process in the contents distribution apparatus 1.

Firstly, as shown in FIG. 8, on power of the contents distribution apparatus 1 being turned on, in the contents distribution apparatus 1, the CPU 102 executes initial setting processes, such as permitting an access to the main memory 105 and hard disc device 103, and initializing a working area (step S100), puts each program 115 to 119, and 121, into a condition in which they are executed by the CPU 102 and, after starting up a function as the controller 130, moves the process to step S121.

In step S121, the controller 130 in the contents distribution apparatus 1 determines whether or not there has been a request for a session establishment or severance from a terminal apparatus 2. In the process, the controller 130 in the contents distribution apparatus 1 determines whether or not there has been a request for a session establishment or severance from a terminal apparatus 2, via the network interface 104.

In the process, if it is determined that there has been a request for a session establishment (step S121: Yes), the controller 130 establishes a connection with that terminal apparatus 2 (step S122) while, if it is determined that there has been a request for a session severance (step S121: Yes) the controller 130 severs the connection with that terminal apparatus 2 (step S122), and moves the process to step S110. That is, the controller 130, in accordance with the request from the terminal apparatus 2, carries out a control changing and setting a connection condition of the terminal apparatus.

Contrarily, if it is determined, in step S121, that there has been no request from the terminal apparatus 2 for either a session establishment or severance (step S121: No), the controller 130 moves the process to step S131.

In step S131, the controller 130 in the contents distribution apparatus 1 determines whether or not it is a distribution time. In the process, the controller 130 in the contents distribution apparatus 1, referring to a distribution time and the like in a contents database 114, determines whether or not the current time is the distribution time.

In the process, if it is determined that it is the distribution time (step S131: Yes), the controller 130 retrieves contents data corresponding to contents ID for which it is determined that the distribution time has been reached, starts a streaming transmission to a terminal apparatus 2 connected on a lower level (step S132), and moves the process to step S110. That is, the controller 130 determines whether or not a distribution time of contents data stored in the hard disc device 103 has been reached, and when it is determined that the distribution time of the contents data has been reached, it being determined to distribute directly to each contents channel, distributes the contents data to a terminal apparatus connected on a lower level (a terminal apparatus on an uppermost level). The controller 130 which executes this kind of step functions as a distribution time determination unit, and as the contents data distribution unit.

Contrarily, if it is determined, in step S131, that it is not the distribution time (step S131: No), the controller 130 moves the process to step S141.

In step S141, the controller 130 in the contents distribution apparatus 1 determines whether or not the distribution is complete. In the process, the controller 130 in the contents distribution apparatus 1 determines whether or not the distribution of the contents data is complete.

In the process, if it is determined that the distribution is complete (step S141: Yes), the controller 130 transmits the contents ID corresponding to the contents data of which the distribution is complete, and data indicating that the distribution is complete, to the connection management apparatus 3 (step S142), and moves the process to step S110. In this way, by the controller 130 notifying the connection management apparatus 3 of the fact that the distribution of the contents data is complete, the connection management apparatus 3 can delete topology information from the topology database.

Contrarily, if it is determined, in step S141, that the distribution is not complete (step S141: No), the controller 130 moves the process to step S110.

In step S110, the controller 130 determines whether or not the power is turned off and, if it is determined that the power is turned off, finishes the process, while if it is determined that the power is not turned off, the controller 130 executes the process again from step S101.

Description of Terminal Apparatus 2 Process Flow

Figure 9:
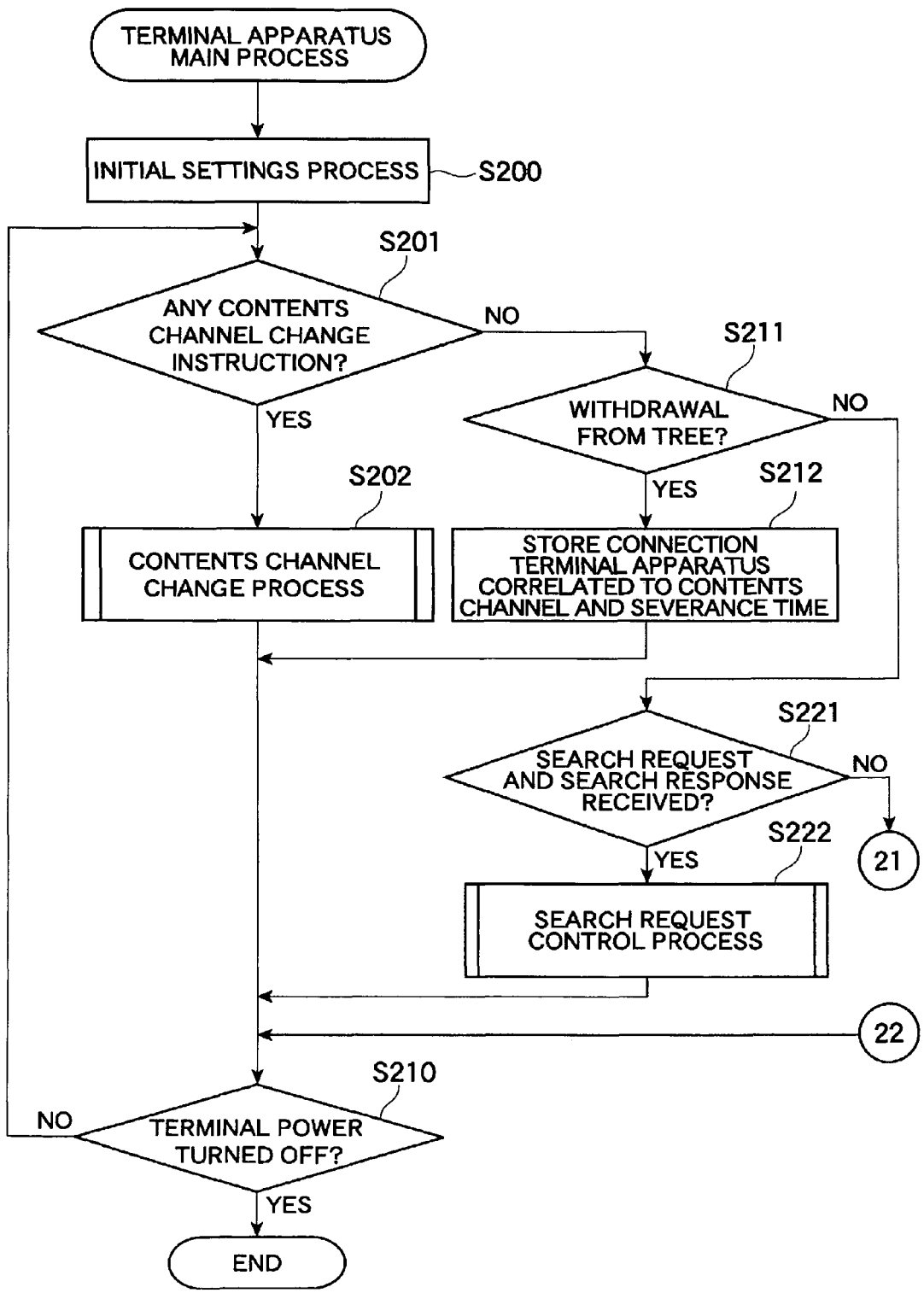
FIG. 9 is a flowchart showing a process carried out by a controller of the terminal apparatus.
Figure 10:
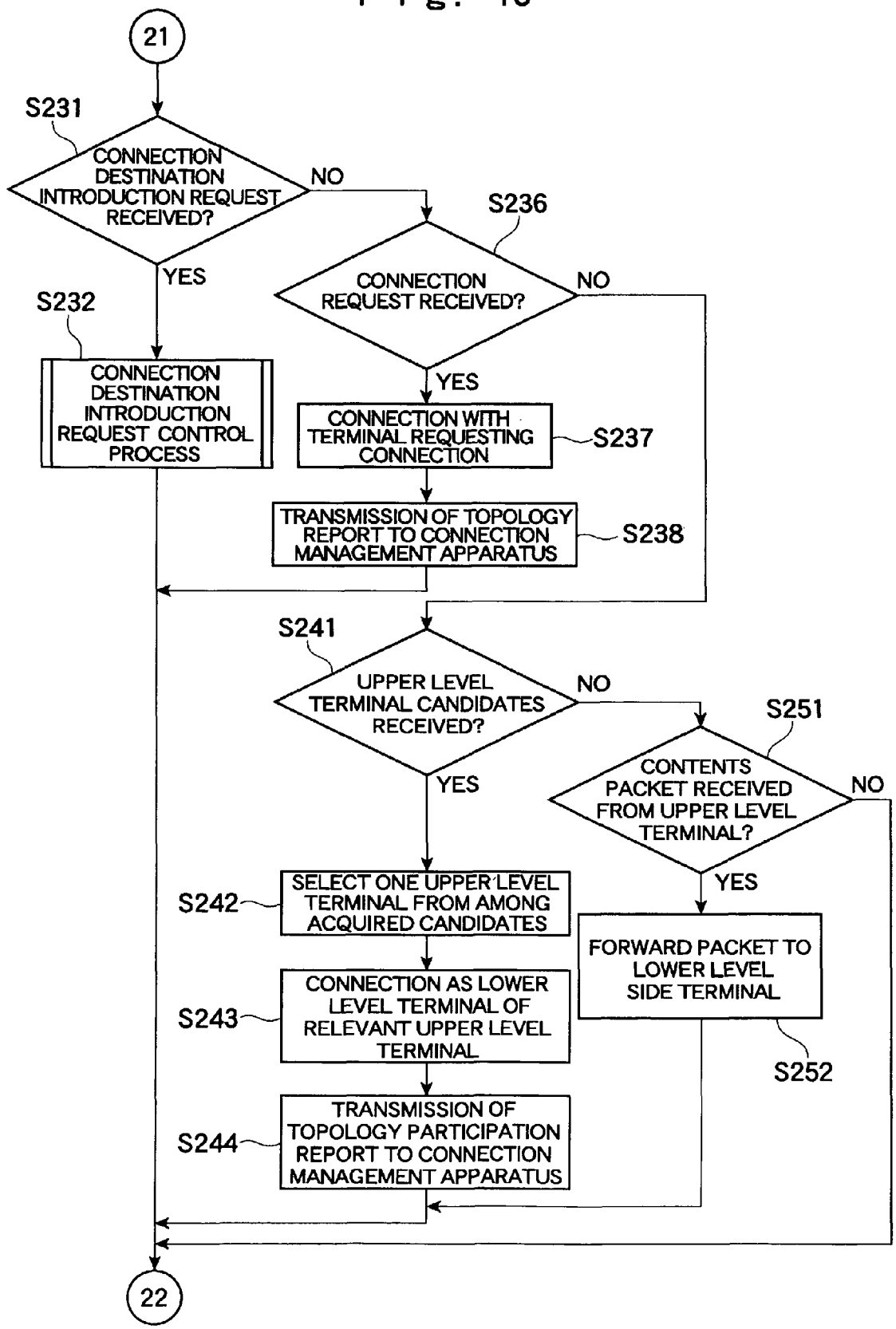
FIG. 10 is a flowchart showing a process carried out by the controller of the terminal apparatus.

Firstly, a description will be given, referring to FIGS. 9 to 14, of more specific operations of the terminal apparatus 2. FIGS. 9 and 10 are flowcharts showing an overall process in the terminal apparatus 2.

Firstly, as shown in FIG. 9, on power of the terminal apparatus 2 being turned on, in the terminal apparatus 2, the CPU 202 executes initial setting processes, such as permitting an access to the main memory 205 and hard disc device 203, and initializing a working area (step S200), puts each program 215 to 219, and 221, into a condition in which they are executed by the CPU 202 and, after starting up a function as the controller 230, moves the process to step S201.

In step S201, the controller 230 determines whether or not there has been an instruction to change a contents channel. In the process, the controller 230 determines whether or not there has been an instruction to change a contents channel, in accordance with an operation by the user of the user input remote control 208. That is, the controller 230 determines whether or not a change instruction, causing a change of the contents channel, has been issued. The controller 230 which executes this kind of step functions as the contents channel change determination unit.

In the process, if it is determined that there has been an instruction to change the contents channel (step S201: Yes) the controller 230 executes a contents channel change process (step S202), to be described in detail hereafter using FIGS. 11 and 12, and moves the process to step S210.

In step S210, the controller 230 determines whether or not the power of the terminal is turned off and, if it is determined that the power of the terminal is turned off, finishes the process, while if it is determined that the power of the terminal is not turned off, the controller 230 executes the process again from step S201.

Contrarily, if it is determined, in step S201, that there has been no instruction to change the contents channel (step S201: No), the controller 230 moves the process to step S211.

In step S211, the controller 230 determines whether or not there has been a withdrawal from a tree. In the process, in the event that a connection is severed in accordance with an operation, or the like, by the user of the user input remote control 208, the controller 230 determines that there has been a withdrawal from the tree.

In the process, if it is determined that there has been a withdrawal from the tree (step S211: Yes), the controller 230 stores identification information of the terminal apparatus which has been connected, correlated to a contents channel to which it has been connected and to a connection severance time, in the connection history table (step S212), and moves the process to step S210. That is, the controller 230 stores terminal apparatus which have previously been connected on an upper level and a lower level, correlating them to a contents channel of the terminal apparatus, and to a connection time at which they have been connected. The controller 230 and hard disc device 203 which execute this kind of step function as the connection terminal apparatus storage unit.

Contrarily, if it is determined, in step S211, that there has been no withdrawal from the tree (step S211: No), the controller 230 moves the process to step S221.

In step S221, the controller 230 determines whether or not a search request and a search response have been received. In the process, the controller 230 determines whether or not a search request and a search response, transmitted from another terminal apparatus 2 connected on an upper level or a lower level, have been received.

In the process, if it is determined that a search request and a search response have been received (step S221: Yes), the controller 230 executes a search request control process (step S222), to be described in detail hereafter using FIG. 13, and moves the process to step S210.

Also, contrarily, if it is determined, in step S221, that no search request or search response has been received (step S221: No), the controller 230 moves the process to step S231 of FIG. 10.

In step S231, the controller 230 determines whether or not a connection destination introduction request, requesting an introduction of a connection destination, has been received from another terminal apparatus 2.

In the process, if it is determined that a connection destination introduction request has been received (step S231: Yes), the controller 230 executes a connection destination introduction request control process (step S232), to be described in detail hereafter using FIG. 14, and moves the process to step S210 of FIG. 9.

Contrarily, if it is determined, in step S231, that no connection destination introduction request has been received (step S231: No), the controller 230 moves the process to step S236.

In step S236, the controller 230 determines whether or not a connection request has been received from another terminal apparatus 2.

In the process, if it is determined that a connection request has been received (step S236: Yes), the controller 230 connects the terminal apparatus 2 which has made the request on a level below the terminal apparatus 2 itself (step S237) Then, the controller 230 transmits a topology report to the connection management apparatus 3 (step S238), and moves the process to step S210 of FIG. 9.

Contrarily, if it is determined, in step S236, that no connection request has been received (step S236: No), the controller 230 moves the process to step S241.

In step S241, the controller 230 determines whether or not upper level terminal candidates have been received from another terminal apparatus 2 and the connection management apparatus 3. In the process, the controller 230 determines whether or not upper level terminal candidates have been received from another terminal apparatus 2 and the connection management apparatus 3, via the network interface 204, in response to a transmission of a connection destination candidate request.

In the process, if it is determined that upper level terminal candidates have been received (step S241: Yes), the controller 230 selects one upper level terminal from among the acquired candidates (step S242). That is, the controller 230 receives connection destination candidates from another terminal apparatus 2 and the connection management apparatus 3, and selects anyone from the received connection destination candidates. The controller 230 which executes this kind of step functions as the connection destination candidate reception unit. In the event that only one upper level terminal is received, the controller 230 does not execute a selection process.

Then, the controller 230 connects as a lower level terminal of the upper level terminal (step S243). That is, the controller 230 connects to a received connection destination candidate, such as the contents distribution apparatus 1 or another terminal apparatus 2. The controller 230 which executes this kind of step functions as the connection unit. Then, the controller 230 transmits a topology participation report to the connection management apparatus 3 (step S244), and moves the process to step S210 of FIG. 9.

Contrarily, if it is determined, in step S241, that no upper level terminal candidate has been received from another terminal apparatus 2 or the connection management apparatus 3 (step S241: No), the controller 230 moves the process to step S251.

In step S251, the controller 230 determines whether or not a contents packet has been received from an upper level terminal. In the process, the controller 230 determines whether or not a contents packet has been received, via the network interface 204, from the upper level terminal connected on the upper level in step S243.

In the process, if it is determined that the contents packet has been received from the upper level terminal (step S251: Yes), in the event that there is a lower level terminal on a lower level side, the controller 230 forwards the packet to the lower level terminal on the lower level side (step S252). That is, the controller 230 receives contents data from the contents distribution apparatus, or another upper level terminal apparatus, connected on the upper level, and carries out a control relaying the received contents data to another lower level terminal apparatus connected on the lower level. The controller 230 which executes this kind of step functions as the contents reception unit and the contents data relay control unit. Then, the controller 230 acquires the contents data from the ring buffer 220, stores them in the hard disc device 203, and moves the process to step S210 of FIG. 9.

Contents Channel Change Process

Next, a specific description will be given, referring to FIGS. 11 and 12, of the contents channel change process carried out in step S202 shown in FIG. 9.

Figure 11:
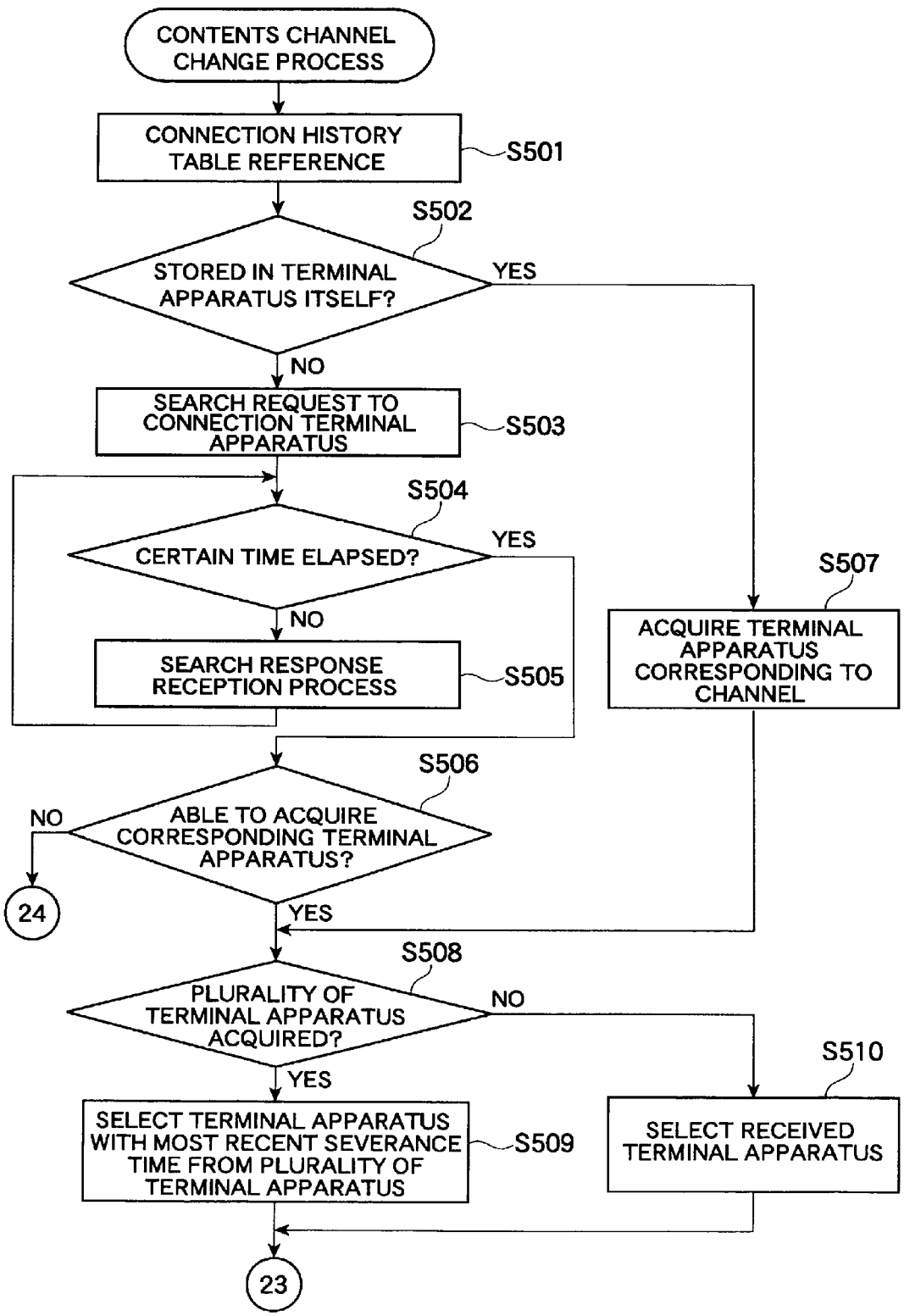
FIG. 11 is a flowchart showing a process carried out by the controller of the terminal apparatus.

Firstly, as shown in FIG. 11, the controller 230 in a terminal apparatus 2 refers to the connection history table in the hard disc device 203 (step S501), and determines whether or not a terminal apparatus 2 is stored in the terminal apparatus 2 itself, in the connection history table (step S502) Herein, the controller 230 determines whether or not a terminal apparatus 2 corresponding to a contents channel for which a change instruction has been issued is stored in the connection history table. That is, the controller 230 determines whether or not, among terminal apparatus stored in the connection history table, there is stored a terminal apparatus corresponding to the contents channel for which the change instruction has been issued. The controller 230 which executes this kind of step functions as the terminal apparatus storage determination unit.

In the process, if it is determined that a terminal apparatus 2 is stored in the terminal apparatus 2 itself (step S502: Yes), the controller 230 acquires the terminal apparatus corresponding to the contents channel (step S507), and moves the process to step S508.

In this way, in the event that the terminal apparatus corresponding to the contents channel for which the change instruction has been issued is stored in the actual terminal apparatus in which the instruction to change the contents data has been issued, it being possible to select it as the connection destination candidate introduction terminal apparatus without making an unnecessary inquiry to other terminal apparatus, it is possible to avoid an increase in accesses to other terminal apparatus.

Contrarily, if it is determined that no terminal apparatus 2 is stored in the terminal apparatus 2 itself (step S502: No), the controller 230 moves the process to step S503.

In step S503, the controller 230 makes a search request to other terminal apparatus 2 connected on an upper level and a lower level. At least the contents channel for which the change instruction has been issued, and an initial value of a relay node quantity, are included in the search request. That is, in the event that it is determined that no terminal apparatus corresponding to the contents channel for which the change instruction has been issued is stored in the connection history table, the controller 230 makes an inquiry (the search request) of the other terminal apparatus 2 connected on the upper level and the lower level for a terminal apparatus corresponding to the contents channel for which the change instruction has been issued. The controller 230 which executes this kind of step functions as the terminal apparatus inquiry unit. In the event that the process is finished, the controller 230 moves the process to step S504.

In step S504, the controller 230 determines whether or not a certain time has elapsed since making the search request.

In the process, if it is determined that the certain time has elapsed (step S504: Yes), the controller 230 moves the process to step S506.

Contrarily, if it is determined that the certain time has not elapsed (step S504: No), the controller 230 executes a search response reception process, receiving a terminal apparatus, called a search response, corresponding to the contents channel for which a terminal apparatus has been inquired for (step S505), and moves the process to step S504 again. The controller 230 which executes this kind of step functions as the terminal apparatus reception unit.

In step S506, the controller 230 determines whether or not it has been possible to acquire a terminal apparatus corresponding to the contents channel for which the change instruction has been issued. In the process, the controller 230, depending on whether or not the search response has been received in response to the search request in step S505, determines whether or not it has been possible to acquire a terminal apparatus corresponding to the contents channel for which the change instruction has been issued.

In the process, if it is determined that it has been possible to acquire a terminal apparatus corresponding to the contents channel for which the change instruction has been issued (step S506: Yes), the controller 230 moves the process to step S508.

Contrarily, if it is determined that it has not been possible to acquire a terminal apparatus corresponding to the contents channel for which the change instruction has been issued (step S506: No), the controller 230 moves the process to step S517 of FIG. 12.

In step S508, the controller 230 determines whether or not it has been possible to acquire a plurality of terminal apparatus. In the process, the controller 230, depending on a quantity of terminal apparatus in the search response received in response to the search request in step S505, determines whether or not it has been possible to acquire a plurality of terminal apparatus.

In the process, if it is determined that it has been possible to acquire a plurality of terminal apparatus (step S508: Yes), the controller 230 selects, from the received plurality of terminal apparatus, the terminal apparatus with the most recent connection severance time as a terminal apparatus to which to make a connection destination introduction request (step S509), and moves the process to step S511 of FIG. 12. That is, in the event that it is determined that there is stored a terminal apparatus corresponding to the contents channel for which the change instruction has been issued, the controller 230 selects the terminal apparatus as the connection destination candidate introduction terminal apparatus, while in the event that it is determined that no terminal apparatus corresponding to the contents channel for which the change instruction has been issued is stored, the controller 230 selects a terminal apparatus, corresponding to the contents channel for which the change instruction has been issued, stored in another terminal apparatus as the connection destination candidate introduction terminal apparatus. In particular, in the event that there is a plurality of terminal apparatus corresponding to the contents channel for which the change instruction has been issued, the controller 230 selects, from the plurality of terminal apparatus, the terminal apparatus of which a connection time is the latest as the connection destination candidate introduction terminal apparatus. The controller 230 which executes this kind of step functions as the connection destination candidate introduction terminal apparatus selection unit.

In this way, it being possible to give priority to the terminal apparatus, among the plurality of terminal apparatus, which has previously been connected and of which the connection time is the latest, and select it as the connection destination candidate introduction terminal apparatus, it is possible to increase a possibility that the terminal apparatus is a connection destination candidate introduction terminal apparatus suited to introducing a connection destination candidate, which is, for example, connected to the contents channel for which the change instruction has been issued.

Contrarily, if it is determined that it has not been possible to acquire a plurality of terminal apparatus (step S508: No), the controller 230 selects the one received terminal apparatus as the terminal apparatus to which to make the connection destination introduction request (step S510), and moves the process to step S511 of FIG. 12. That is, in the event that it is determined that there is stored a terminal apparatus corresponding to the contents channel for which the change instruction has been issued, the controller 230 selects the terminal apparatus as the connection destination candidate introduction terminal apparatus, while in the event that it is determined that no terminal apparatus corresponding to the contents channel for which the change instruction has been issued is stored, the controller 230 selects a terminal apparatus, corresponding to the contents channel for which the change instruction has been issued, stored in another terminal apparatus as the connection destination candidate introduction terminal apparatus. The controller 230 which executes this kind of step functions as the connection destination candidate introduction terminal apparatus selection unit.

Figure 12:
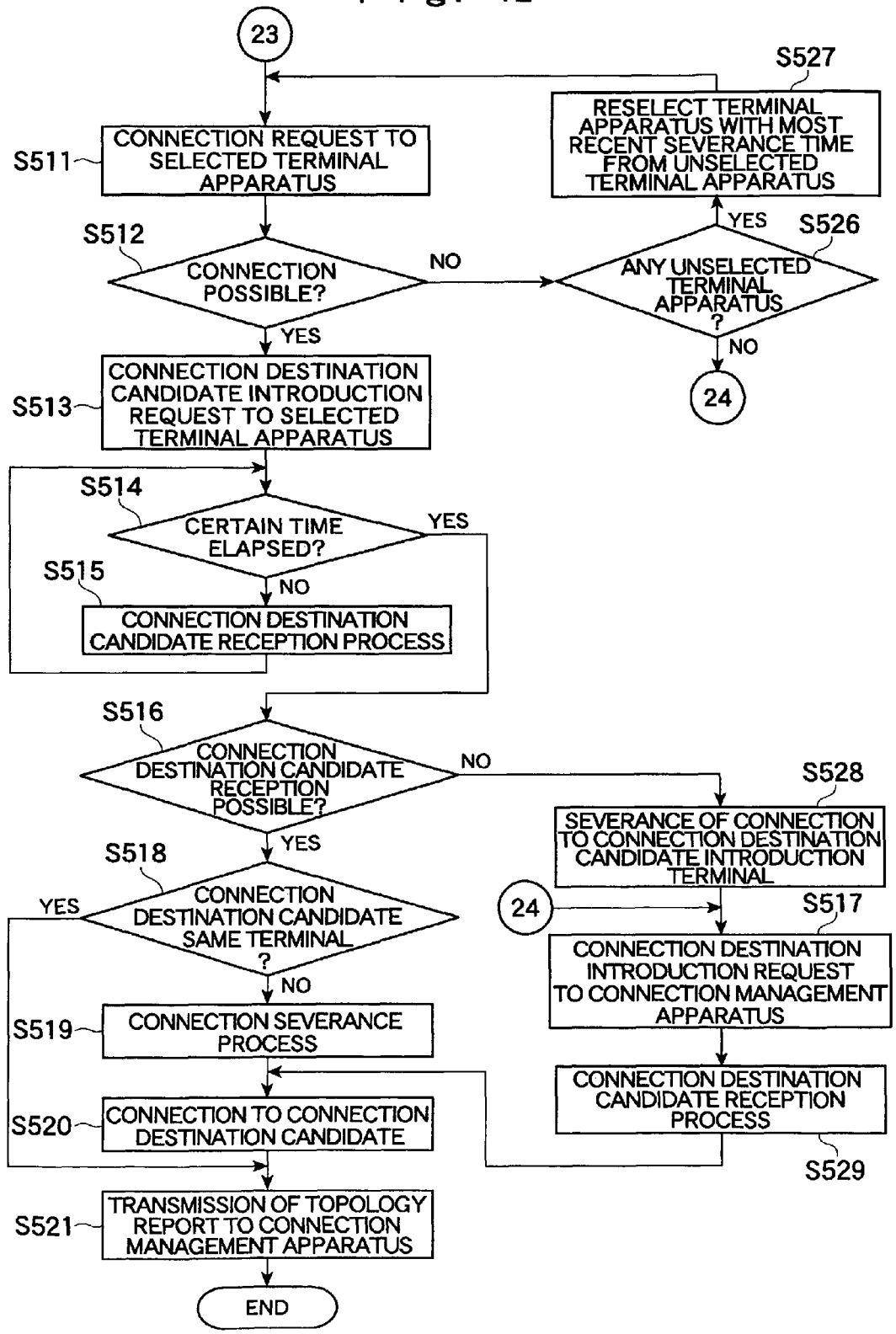
FIG. 12 is a flowchart showing a process carried out by the controller of the terminal apparatus.

In step S511 of FIG. 12, the controller 230 makes a connection request to the terminal apparatus 2 selected as the connection destination candidate introduction terminal apparatus. In the event that the process is finished, the controller 230 moves the process to step S512.

In step S512, the controller 230 determines whether or not it has been possible to connect to the connection destination candidate introduction terminal apparatus.

In the process, if it is determined that it has not been possible to connect to the connection destination candidate introduction terminal apparatus (step S512: No), the controller 230 determines whether or not there are terminal apparatus 2 unselected as the connection destination candidate introduction terminal apparatus (step S526). Then, if it is determined that there are unselected terminal apparatus 2 (step S526: Yes), the controller 230 again selects, from the unselected terminal apparatus, the terminal apparatus of which a connection severance time is the latest (step S527), and moves the process to step S511 again. That is, in the event that there is a plurality of terminal apparatus corresponding to the contents channel for which the change instruction has been issued, the controller 230 selects, from the plurality of terminal apparatus, the terminal apparatus of which the connection time is the latest as the connection destination candidate introduction terminal apparatus. The controller 230 which executes this kind of step functions as the connection destination candidate request unit (corresponding to one example of the second connection destination candidate request unit). Contrarily, if it is determined that there are no unselected terminal apparatus 2 (step S526: No), the controller 230 moves the process to step S517 and, as will be described hereafter, makes a connection destination introduction request to the connection management apparatus 3.

Contrarily, if it is determined that it has been possible to connect to the connection destination candidate introduction terminal apparatus (step S512: Yes), the controller 230 makes a connection destination introduction request to the connection destination candidate introduction terminal apparatus (step S513), and moves the process to step S514. In this process, the controller 230 makes the connection destination introduction request, requesting an introduction of a connection destination candidate, of the terminal apparatus 2 selected as the connection destination candidate introduction terminal apparatus. At least the contents channel for which the change instruction has been issued is included in the connection destination introduction request. That is, the controller 230 requests a connection destination candidate, corresponding to the contents channel for which the change instruction has been issued, of the selected connection destination candidate introduction terminal apparatus. The controller 230 which executes this kind of step functions as the connection destination candidate request unit (corresponding to one example of the second connection destination candidate request unit).

In step S514, the controller 230 determines whether or not a certain time has elapsed since making the connection destination introduction request.

In the process, if it is determined that the certain time has elapsed (step S514: Yes), the controller 230 moves the process to step S516.

Contrarily, if it is determined that the certain time has not elapsed (step S514: No), the controller 230 executes a connection destination candidate reception process, receiving a connection destination candidate (step S515), and moves the process to step S514 again. That is, the controller 230 receives a connection destination candidate from another terminal apparatus 2. The controller 230 which executes this kind of step functions as the connection destination candidate reception unit.

Then, in step S516, the controller 230 determines whether or not it has been possible to receive a connection destination candidate from the connection destination candidate introduction terminal apparatus.

In the process, if it is determined that it has been possible to receive a connection destination candidate (step S516: Yes), the controller 230 moves the process to step S518.

Contrarily, if it is determined that it has not been possible to receive a connection destination candidate (step S516: No), the controller 230 severs the connection with the connection destination candidate introduction terminal apparatus (step S528), and moves the process to step S517.

In step S517, the controller 230 makes a connection destination introduction request to the connection management apparatus, executes the connection destination candidate reception process, receiving a connection destination candidate (step S529), and moves the process to step S520. That is, the controller 230, in the event that no connection destination candidate has been received from the connection destination candidate introduction terminal apparatus, requests a connection destination candidate, corresponding to the contents channel for which the change instruction has been issued, of the connection management apparatus 3. The controller 230 which executes this kind of step functions as the first connection destination candidate request unit.

In step S518, the controller 230 determines whether or not the connection destination candidate introduction terminal apparatus and the connection destination candidate are the same. In the process, the controller 230 determines whether or not the connection destination candidate introduction terminal apparatus to which the connection request has been made in step S511, and the connection destination candidate received in step S515, are the same.

In the process, if it is determined that the connection destination candidate introduction terminal apparatus and the connection destination candidate are the same (step S518: Yes), the controller 230 moves the process to step S521, without executing step S519 and step S520, to be described hereafter.

Contrarily, if it is determined that the connection destination candidate introduction terminal apparatus and the connection destination candidate are not the same (step S518: No), the controller 230 moves the process to step S519.

In step S519, the controller 230 executes a connection severance process, severing the connection with the connection destination candidate introduction terminal apparatus. Then, the controller 230 makes a request, to the terminal apparatus received as the connection destination candidate, for a connection as an upper level terminal apparatus, and connects (step S520). In this way, the controller 230 connects to the received connection destination candidate, such as the contents distribution apparatus 1 or another terminal apparatus 2. The controller 230 which executes this kind of step functions as the connection unit. In the event that the process is finished, the controller 230 moves the process to step S521.

In step S521, the controller 230 transmits a topology report to the connection management apparatus 3 (step S521) and, when the connection in the contents channel for which the change instruction has been issued is complete, severs a connection with terminal apparatus connected on an upper level and a lower level in the contents channel before the change. In the event that the process is finished, the controller 230 finishes the sub-routine.

Search Request Control Process

Next, a specific description will be given, referring to FIG. 13, of the search request control process, carried out in step S222, shown in FIG. 9.

Figure 13:
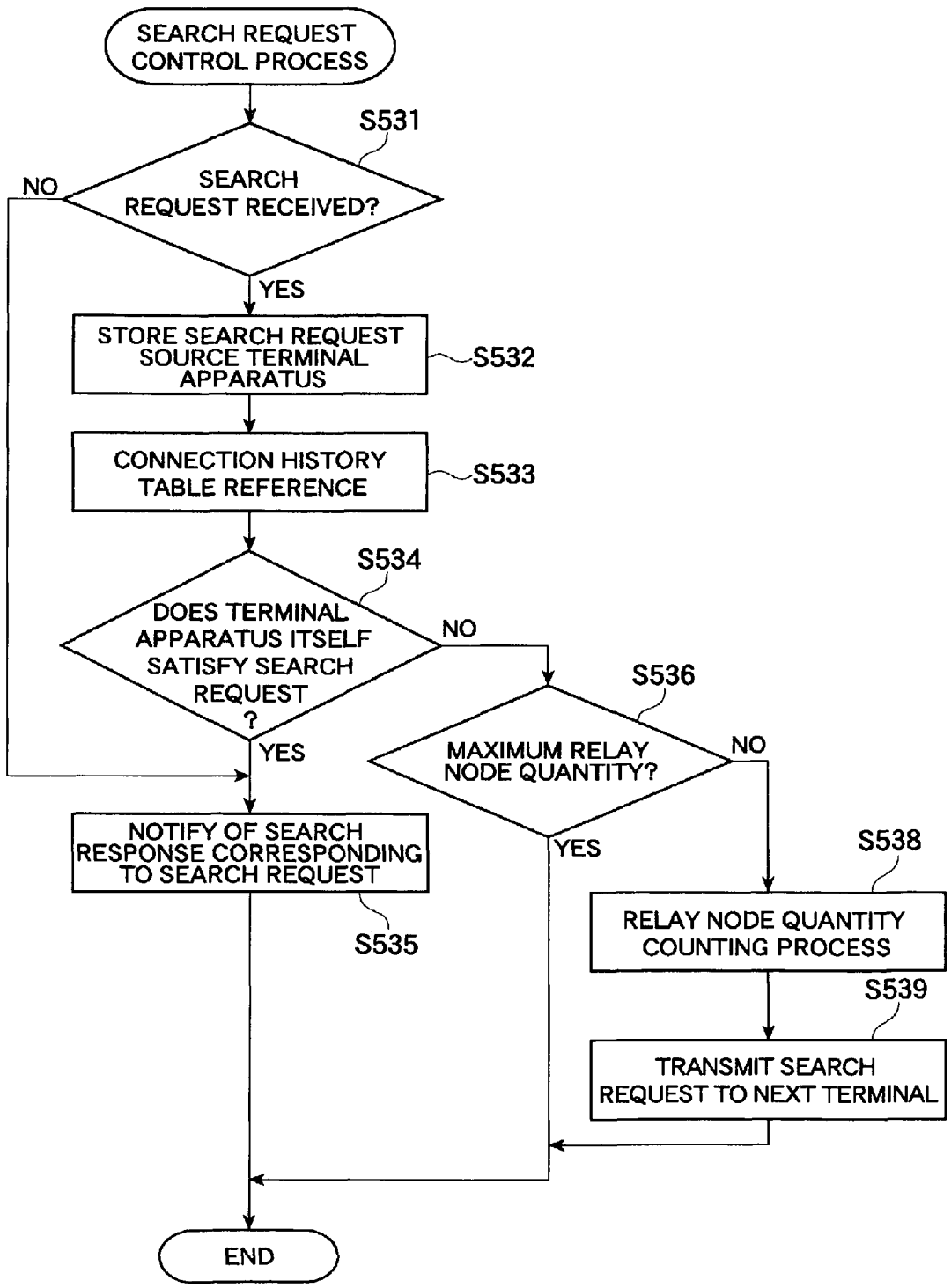
FIG. 13 is a flowchart showing a process carried out by the controller of the terminal apparatus.

Firstly, as shown in FIG. 13, the controller 230 in the terminal apparatus 2 determines whether or not a search request has been received from another terminal apparatus 2 (step S531) That is, the controller 230 receives an inquiry for a terminal apparatus corresponding to a predetermined contents channel from another terminal apparatus. The controller 230 which executes this kind of step functions as the terminal apparatus inquiry reception unit.

In the process, if it is determined that a search request has been received (step S531: Yes), the controller 230 stores the terminal apparatus 2 which is the search request source (step S532). Then, the controller 230 refers to the connection history table in the hard disc device 203 (step S533), and determines whether or not the terminal apparatus 2 itself satisfies the search request in the connection history table (step S534). Herein, the controller 230 determines whether or not a terminal apparatus 2 corresponding to the contents channel included in the search request, that is, the contents channel for which the change instruction has been issued, satisfies the search request, depending on whether or not it is stored in the connection history table. That is, the controller 230, in the event of receiving an inquiry for a terminal apparatus, determines whether or not there is stored, among the terminal apparatus stored in the connection history table, a terminal apparatus corresponding to the predetermined contents channel. The controller 230 which executes this kind of step functions as the terminal apparatus storage determination unit.

In the process, if it is determined that the terminal apparatus 2 itself satisfies the search request (step S534: Yes), the controller 230 moves the process to step S535.

Contrarily, if it is determined that the terminal apparatus 2 itself does not satisfy the search request (step S534: No), the controller 230 moves the process to step S536.

Also, if it is determined that no search request has been received (step S531: No), the controller 230 determines that it is a search response corresponding to a search request, rather than a search request, and moves the process to step S535.

In step S535, the controller 230 informs of the search response corresponding to the search request. In the process, the controller 230 informs the terminal apparatus 2 stored in step S532 of the search response corresponding to the search request. The search response is either a search response determined in the terminal apparatus 2 itself, or a search response determined in another terminal apparatus, and notified of. In this way, the controller 230, when it is determined, in the event of receiving an inquiry, called a search request, for a terminal apparatus corresponding to the contents channel for which the change instruction has been issued, that there is stored a terminal apparatus corresponding to the predetermined contents channel, or in the event of receiving a result of the inquiry for the terminal apparatus, notifies the terminal apparatus which has made the inquiry for the terminal apparatus. The controller 230 which executes this kind of step functions as the terminal apparatus notification unit.

In step S536, the controller 230 determines whether or not the maximum relay node quantity is reached. In the process, the controller 230 retrieves the relay node quantity included in the search request, and the maximum relay node quantity stored (set) in advance in the hard disc device 203, and determines whether or not the relay node quantity is the maximum relay node quantity. That is, the controller 230 determines whether or not a counted inquiry level quantity is equal to, or greater than, the predetermined quantity. The controller 230 which executes this kind of step functions as the inquiry level quantity determination unit.

In the process, if it is determined that it is the maximum relay node quantity (step S536: Yes), the controller 230 finishes the sub-routine. That is, the controller 230, when it is determined, in the event of receiving an inquiry, called a search request, for a terminal apparatus corresponding to the contents channel for which the change instruction has been issued, that no terminal apparatus corresponding to the predetermined contents channel is stored, on a condition that it is determined that the counted inquiry level quantity is equal to, or greater than, the maximum relay node quantity (the predetermined quantity), carries out a control forbidding inquiries to other terminal apparatus. The controller 230 which executes this kind of step functions as the terminal apparatus inquiry unit.

Contrarily, if it is determined that it is not the maximum relay node quantity (step S536: No), the controller 230 executes a process counting the relay node quantity (step S538), transmits the search request to the next terminal apparatus 2 (step S539), and finishes the sub-routine. In this way, the controller 230 counts a quantity of levels at which the inquiry, called a search request, for a terminal apparatus corresponding to the contents channel for which the change instruction has been issued, has been made. The controller 230 which executes this kind of step functions as the inquiry level quantity counting unit. Then, the controller 230, when it is determined, in the event of receiving an inquiry, called a search request, for a terminal apparatus corresponding to the contents channel for which the change instruction has been issued, that no terminal apparatus corresponding to the contents channel is stored, on a condition that it is determined that the counted inquiry level quantity has not reached the maximum relay node quantity (the predetermined quantity), makes an inquiry for a terminal apparatus to another terminal apparatus 2 connected on an upper level or a lower level. The controller 230 which executes this kind of step functions as the terminal apparatus inquiry unit.

In this way, previously connected terminal apparatus and contents channels being stored correlated, by requesting a connection destination candidate of a terminal apparatus corresponding to the contents channel for which the change instruction has been issued, it is possible to avoid an increase in accesses between terminal apparatus and the connection management apparatus, which accompanies a change of a contents channel.

Also, in the event that a terminal apparatus corresponding to a predetermined contents channel is stored in a terminal apparatus which actually receives an inquiry for the terminal apparatus corresponding to the predetermined contents channel, it being possible to report a connection destination candidate introduction terminal apparatus without making an unnecessary inquiry to other terminal apparatus, it is possible to avoid an increase in accesses to other terminal apparatus.

Also, even in the event that no terminal apparatus corresponding to the predetermined contents channel is stored, the inquiry level quantity not becoming equal to or greater than the predetermined quantity, it is possible to avoid an excessive increase in inquiries.

Connection Destination Introduction Request Control Process

Next, a specific description will be given, referring to FIG. 14, of the connection destination introduction request control process carried out in step S232, shown in FIG. 10.

Figure 14:
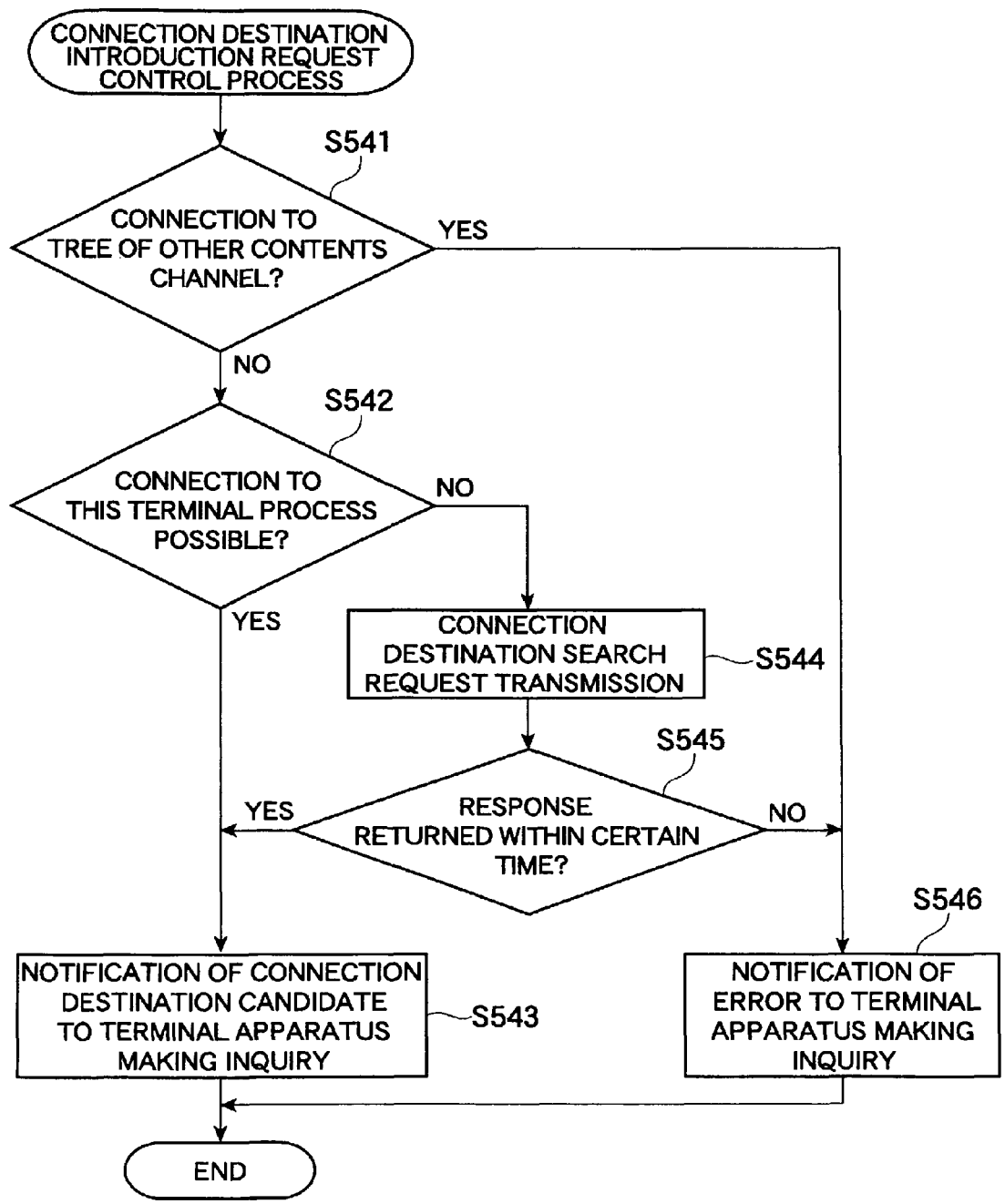
FIG. 14 is a flowchart showing a process carried out by the controller of the terminal apparatus.

Firstly, as shown in FIG. 14, the controller 230 in the terminal apparatus 2 determines whether or not it is connected to a tree of another contents channel (step S541). In the process, the controller 230 retrieves the contents channel which is included in the received connection destination introduction request, and for which the change instruction has been issued and, based on the contents channel, determines whether or not it is connected to the tree of another contents channel. That is, the controller 230 determines whether or not, in the event of being requested for a connection destination candidate, the terminal apparatus 2 which has actually been requested for the connection destination candidate is a terminal apparatus corresponding to the contents channel in the request. The controller 230 which executes this kind of step functions as the contents channel connection determination unit.

In the process, if it is determined that it is connected to the tree of another contents channel (step S541: Yes), the controller 230 carries out a notification of an error to the inquiring terminal apparatus which has made the connection destination introduction request (step S546), and finishes the sub-routine. By this means, it is possible to notify the terminal apparatus 2 which has made the connection destination introduction request of the fact that the tree to which it is currently connected is not the tree of the contents channel for which the change instruction has been issued, and that it is not possible to introduce a connection destination.

Contrarily, if it is determined that it is not connected to the tree of another contents channel, that is, if it is determined that it is connected to the tree of the contents channel for which the change instruction has been issued (step S541: No), the controller 230 moves the process to step S542.

In step S542, the controller 230 determines whether or not it is possible to connect on a level below the terminal apparatus 2. In the process, the controller 230 determines whether or not it is a condition in which it is possible to connect the terminal apparatus 2 on a level below the terminal apparatus 2 itself. That is, the controller 230, when it is determined, in the event of being requested for a connection destination candidate, that the terminal apparatus 2 which is actually requested for the connection destination candidate is a terminal apparatus corresponding to the channel contents in the request, determines whether or not it is possible to connect to the terminal apparatus 2 which is actually requested for the connection destination candidate. The controller 230 which executes this kind of step functions as the connection determination unit.

In the process, if it is determined that it is possible to connect to a level below the terminal apparatus 2 (step S542: Yes), the controller 230 selects the terminal apparatus 2 as the connection destination candidate, and moves the process to step S543. That is, in the event that it is determined that the connection is possible, the controller 230 selects the terminal apparatus 2 which is actually requested to introduce the connection destination candidate as the connection destination candidate. The controller 230 which executes this kind of step functions as the connection destination candidate selection unit (corresponding to one example of the second connection destination candidate selection unit).

Contrarily, if it is determined that it is not possible to connect to a level below the terminal apparatus 2 (step S542: No), the controller 230 moves the process to step S544.

In step S544, the controller 230 transmits a connection destination search request, to search for a connection destination candidate, to terminal apparatus 2 connected on an upper level and a lower level, and moves the process to step S545. That is, if it is determined, in step S542, that it is not possible to connect to the terminal apparatus 2 itself (step S542: No), the controller 230 makes an inquiry to a terminal apparatus 2 on the upper level or the lower level for a terminal apparatus to which a connection is possible. The controller 230 which executes this kind of step functions as the connection possible terminal apparatus inquiry unit.

In step S545, the controller 230 determines whether or not a response, in response to the connection destination search request, has returned within a certain time. In the process, the controller 230 determines whether or not a response has returned, within the certain time, from the terminal apparatus 2, connected on the upper level or the lower level, to which the connection destination search request has been transmitted, in response to the request.

In the process, if it is determined that a response has returned, in response to the connection destination search request, within the certain time (step S545: Yes), the controller 230 selects the terminal apparatus 2 included in the response as the connection destination candidate, and moves the process to step S543. That is, the controller 230 selects, as the connection destination candidate, a terminal apparatus 2 to which a connection is possible, for which the inquiry has been made. The controller 230 which executes this kind of step functions as the connection destination candidate selection unit (corresponding to one example of the second connection destination candidate selection unit).

Contrarily, in the event that no response has returned, in response to the connection destination search request, within the certain time, or a response to the effect that there is no connection destination candidate has returned (step S545: No), the controller 230 carries out a notification of an error to the inquiring terminal apparatus which has made the connection destination introduction request (step S546), and finishes the sub-routine. By this means, it is possible to notify the terminal apparatus 2 which has made the connection destination introduction request of the fact that the tree to which it is currently connected is not the tree of the contents channel for which the change instruction has been issued, and that it is not possible to introduce a connection destination.

In step S543, the controller 230 notifies the inquiring terminal apparatus which has made the connection destination introduction request of the connection destination candidate acquired in step S542 or step S545. The controller 230 which executes this kind of step functions as the connection destination candidate notification unit (corresponding to one example of the second connection destination candidate notification unit).

In this way, it being possible to determine whether or not a connection destination candidate terminal apparatus is connected to a hierarchical structure corresponding to the contents channel which has been requested, it is possible to determine a possibility of introducing a connection destination candidate corresponding to the contents channel. Also, in the event that, the connection destination candidate terminal apparatus being connected to the hierarchical structure corresponding to the contents channel, a connection is possible to the connection destination candidate terminal apparatus itself, it is possible to swiftly and reliably introduce the connection destination candidate. Contrarily, in the event that, although the connection destination candidate terminal apparatus is connected to the hierarchical structure corresponding to the contents channel, the connection to the connection destination candidate terminal apparatus itself is not possible, it is possible to make an inquiry to a terminal apparatus on an upper level or a lower level and, as a result of the inquiry, reliably introduce the connection destination candidate.

Description of Connection Management Apparatus 3 Process Flow

Figure 15:
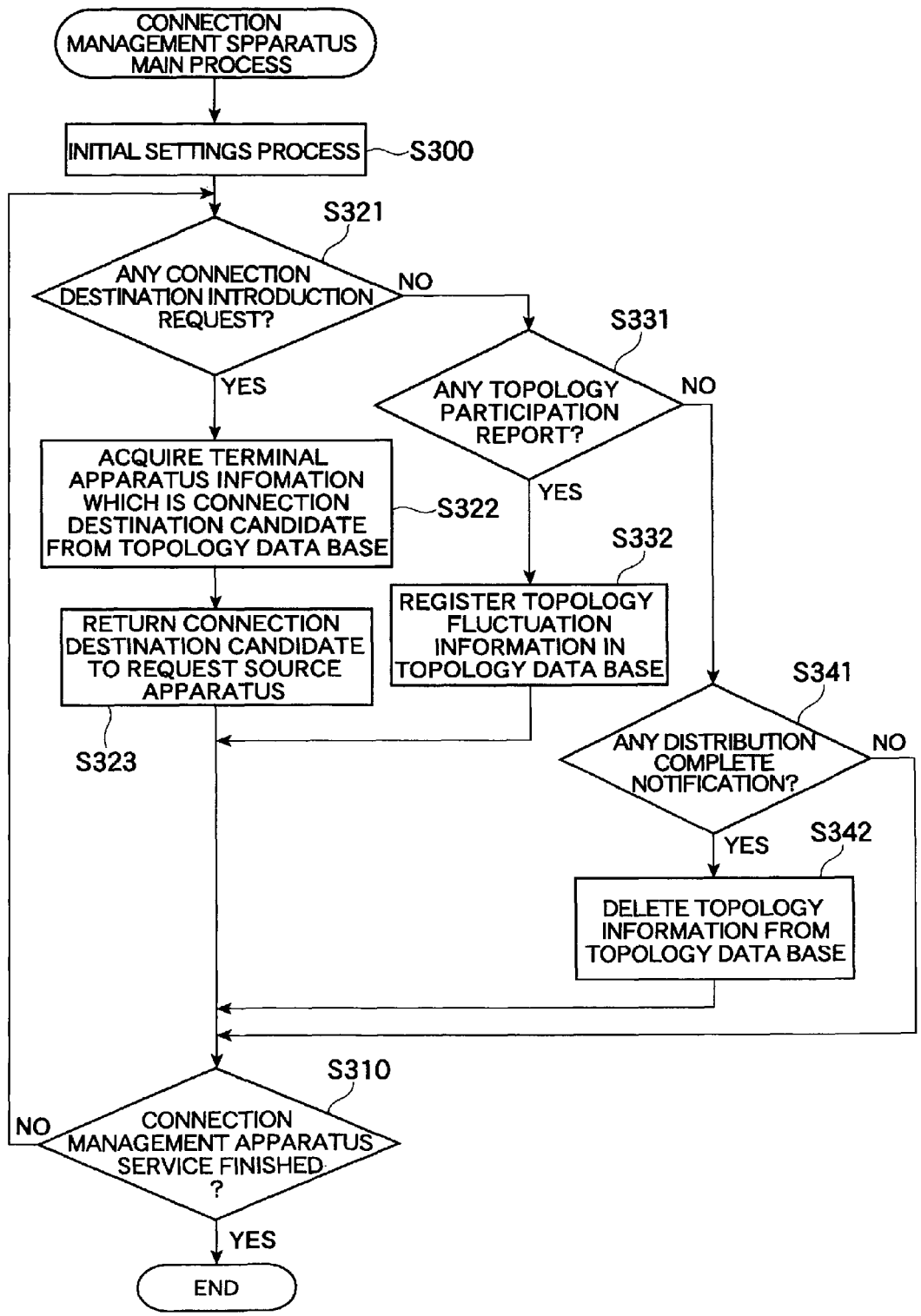
FIG. 15 is a flowchart showing a process carried out by a controller of the connection management apparatus.

Next, a description will be given, referring to FIG. 15, of more specific operations of the connection management apparatus 3. FIG. 15 is a flowchart showing an overall process in the connection management apparatus 3.

As shown in FIG. 15, on power of the connection management apparatus 3 being turned on, in the connection management apparatus 3, the CPU 302 executes initial setting processes, such as permitting an access to the main memory 305 and hard disc device 303, and initializing a working area (step S300), puts each program 317 to 320 into a condition in which they are executed by the CPU 302 and, after starting up a function as the controller 330, moves the process to step S321.

In step S321, the controller 330 determines whether or not there is a connection destination introduction request. In the process, the controller 330 determines whether or not there has been a connection destination introduction request, via the network interface 304, from a terminal apparatus 2.

In the process, if it is determined that there is a connection destination introduction request (step S321: Yes) the controller 330 acquires terminal apparatus information, which is a connection destination candidate, from the topology database (step S322). That is, the controller 330 receives the connection destination introduction request transmitted from the terminal apparatus 2. Also, the controller 330, when receiving the connection destination introduction request, refers to the topology database in the hard disc device 303, and selects a connection destination candidate, to which a connection is possible, corresponding to the contents channel included in the connection destination candidate request. The controller 330 which executes this kind of step functions as the connection destination introduction request reception unit, and the first connection destination candidate selection unit.

Then, the controller 330 returns the connection destination candidate to the request source apparatus (step S323), and moves the process to step S310. That is, the controller 330 notifies the terminal apparatus which has transmitted the connection destination candidate request of the selected connection destination candidate. The controller 330 which executes this kind of step functions as the first connection destination candidate notification unit.

Contrarily, if it is determined, in step S321, that there is no connection destination introduction request (step S321: No), the controller 330 moves the process to step S331.

In step S331, the controller 330 determines whether or not there is a topology participation report. In the process, the controller 330 determines whether or not there is a topology participation report, via the network interface 304, from a terminal apparatus 2.

In the process, if it is determined that there is a topology participation report (step S331: Yes), the controller 330 registers topology fluctuation information in the topology database in the hard disc device 303 (step S332), and moves the process to step S310. The controller 330 which executes this kind of step functions as the connection condition information storage unit.

Contrarily, if it is determined, in step S331, that there is no topology participation report (step S331: No), the controller 330 moves the process to step S341.

In step S341, the controller 330 determines whether or not there is a distribution completion notification. In the process, the controller 330 determines whether or not there has been a distribution completion notification, via the network interface 304, from the contents distribution apparatus 1.

In the process, if it is determined that there is a distribution completion notification (step S341: Yes), the controller 330 deletes the topology information from the topology database in the hard disc device 303 (step S342), and moves the process to step S310. The controller 330 which executes this kind of step functions as the connection condition information storage unit.

Contrarily, if it is determined, in step S341, that there is no distribution completion notification (step S341: No), the controller 330 moves the process to step S310.

In step S310, the controller 330 determines whether or not a service of the connection management apparatus 3 is finished and, if it is determined that the service of the connection management apparatus 3 is finished, finishes the process, while if it is determined that the service of the connection management apparatus 3 is not finished, it executes the process again from step S301.

Second Embodiment

In the embodiment, in the event that there is a plurality of terminal apparatus which introduce a connection destination candidate, the terminal apparatus with the most recent connection time is selected, from the plurality of terminal apparatus, as the connection destination candidate introduction terminal apparatus but, not being limited to this, it is also acceptable, for example, to select at random, regardless of the connection time. That is, in the event that there is a plurality of terminal apparatus corresponding to the contents channel for which the change instruction has been issued, the controller 230 randomly selects the connection destination candidate introduction terminal apparatus from the plurality of terminal apparatus. The controller 230 which executes this kind of step functions as the connection destination candidate introduction terminal apparatus selection unit. By this means, even in the event that there is a plurality of terminal apparatus, it is possible to randomly select any one from the plurality of terminal apparatus.

Third Embodiment

Figure 16:
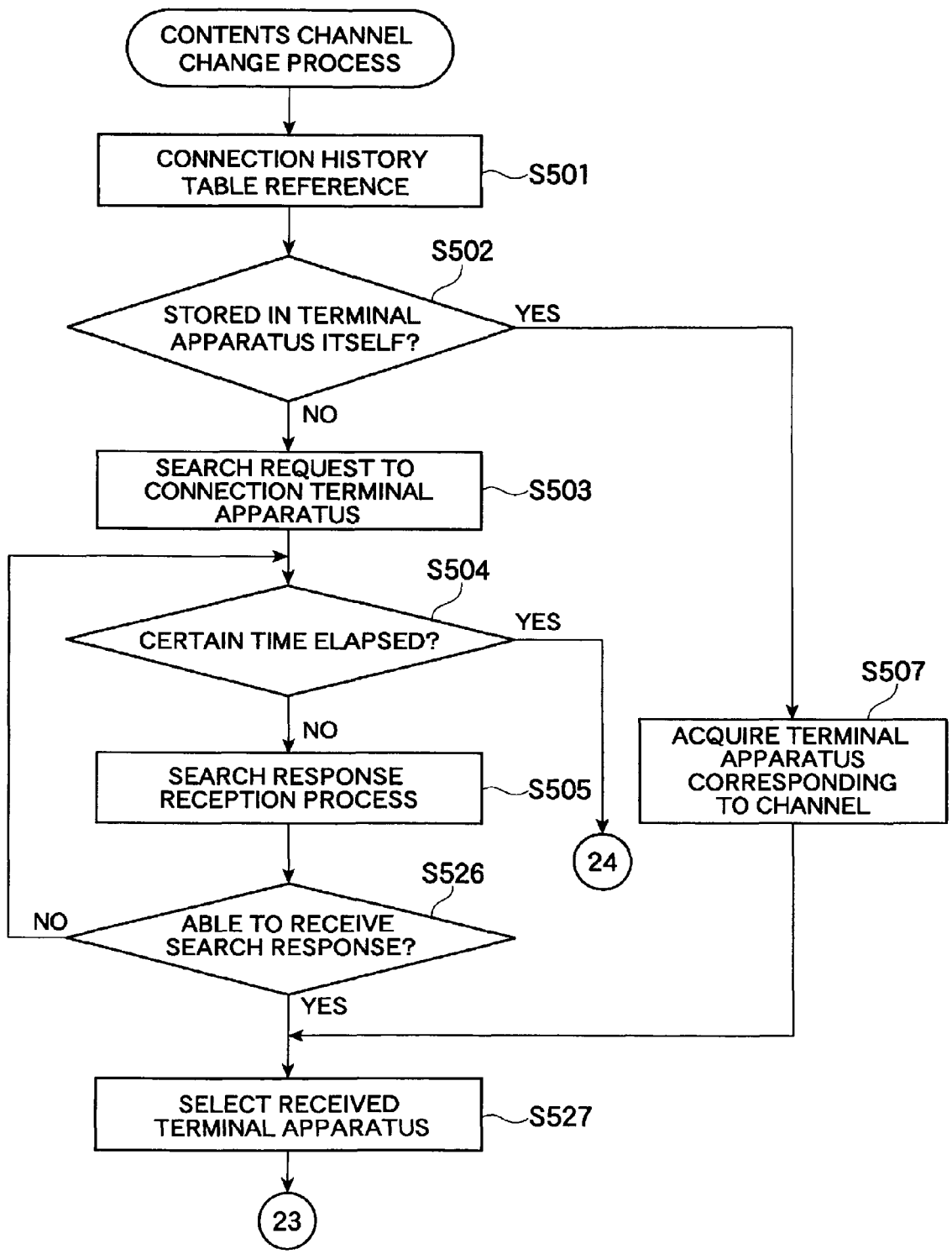
FIG. 16 is a flowchart showing a process carried out by the controller of the terminal apparatus.

Also, for example, it is also acceptable to configure in such a way as to select a first received terminal apparatus as the connection destination candidate introduction terminal apparatus. Specifically, as shown in FIG. 16, if a certain time has not elapsed (step S504: No), after carrying out the search response reception process (step S505), it is determined whether or not a search response has been received (step S526) and, if it is determined that a search response has been received (step S526: Yes), the terminal apparatus included in the received search response is selected as the connection destination candidate introduction terminal apparatus (step S527). By this means, it is possible to select more swiftly as the connection destination candidate introduction terminal apparatus. If a certain time has elapsed (step S504: Yes), it being a case in which no search response has been received as a result of carrying out the search response reception process (step S526: No), the process is moved to the heretofore described step S517.

Other Embodiments

In the embodiment, in the event that the counted relay node quantity is equal to or greater than the maximum relay node quantity, the relay of the search request is forbidden but, not being limited to this, it is also acceptable, for example, not to provide the maximum relay node quantity, or to measure a relay time or the like, and forbid the relay of the search request depending on the relay time. Also, it also being acceptable that the maximum relay node quantity of the search request is one rather than two or more, in this case, even though the search request is received, it does not happen that the search request is relayed.

In the embodiment, the inquiry for the connection destination candidate is made to a terminal apparatus on only one level, of the upper level and the lower level, and a relay of the inquiry for the connection destination candidate is not carried out, but it is also acceptable to arrange in such a way that the relay is carried out.

In the embodiment, in the event that it is not possible to receive the connection destination candidate, the introduction of the connection destination candidate is requested of the connection management apparatus 3 but, not being limited to this, there is no problem, for example, in not requesting the introduction of the connection destination candidate of the connection management apparatus 3.

In the embodiment, the contents distribution system S including the contents distribution apparatus 1, the plurality of terminal apparatus 2, and the connection management apparatus 3 is configured but, not being limited to this, it is also acceptable, for example, that it includes another apparatus, or to have a configuration which does not include the connection management apparatus 3.

Heretofore, a detailed description has been given, based on the drawings, of the some of the embodiments of the invention but, these being illustrative, it is possible to implement the invention in other aspects, applying various modifications and improvements based on knowledge of those skilled in the art, beginning with the aspect described in the above section "Disclosure of the Invention".

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. A contents data distribution system, comprising:
a contents distribution apparatus which distributes contents data via a network;
a plurality of terminal apparatus which, being connected in a multi-leveled hierarchical structure on the network for each of a plurality of contents channels, with the contents distribution apparatus as an apex, receive the contents data via the network, and reproduce the contents data, wherein
the terminal apparatus include:
a connection unit which connects to the contents distribution apparatus or to other terminal apparatus, via the network;
a connection terminal apparatus storage unit which stores a terminal apparatus previously connected by the connection unit, correlated to a contents channel;
a contents channel change determination unit which determines whether or not a change instruction, changing a contents channel, has been issued;
a connection destination candidate introduction terminal apparatus selection unit which, in the event that the contents channel change determination unit determines that an instruction to change a contents channel has been issued, selects a terminal apparatus, from among the other terminal apparatus connected by the connection unit, or the previously connected terminal apparatus stored by the connection terminal apparatus storage unit in the terminal apparatus, corresponding to the contents channel for which the change instruction has been issued, as a connection destination candidate introduction terminal apparatus which introduces a connection destination candidate;
a connection destination candidate request unit which requests a connection destination candidate, corresponding to the contents channel for which the change instruction has been issued, of the connection destination candidate introduction terminal apparatus selected by the connection destination candidate introduction terminal apparatus selection unit;
a connection destination candidate selection unit which selects a connection destination candidate corresponding to the contents channel requested by the connection destination candidate request unit;
a connection destination candidate notification unit which notifies the terminal apparatus which has requested the connection destination candidate of the connection destination candidate selected by the connection destination candidate selection unit; and
a connection destination candidate reception unit which receives the connection destination candidate reported by the connection destination candidate notification unit, wherein
the connection unit has a function of connecting to the connection destination candidate received by the connection destination candidate reception unit.

2. A contents data distribution system, comprising:
a contents distribution apparatus which distributes contents data via a network;
a plurality of terminal apparatus which receive the contents data via the network, and reproduce the contents data; and
a connection management apparatus which manages a connection condition of the contents distribution apparatus and plurality of terminal apparatus on the network, wherein
the connection management apparatus includes:
a connection condition information storage unit which stores connection condition information of the plurality of terminal apparatus, connected in a multi-leveled hierarchical structure on the network for each of a plurality of contents channels, with the contents distribution apparatus as an apex;
a first connection destination candidate selection unit which, based on the connection condition information stored by the connection condition information storage unit, selects a connection destination candidate so that a plurality of terminal apparatus are connected in a multi-leveled hierarchical structure on the network, with the contents distribution apparatus as an apex; and
a first connection destination candidate notification unit which notifies a terminal apparatus of a connection destination candidate selected by the first connection destination candidate selection unit, and wherein
the terminal apparatus include:
a connection unit which connects to the contents distribution apparatus or to other terminal apparatus, via the network;
a connection terminal apparatus storage unit which stores a terminal apparatus previously connected by the connection unit, correlated to a contents channel;
a contents channel change determination unit which determines whether or not a change instruction, changing a contents channel, has been issued;
a connection destination candidate introduction terminal apparatus selection unit which, in the event that the contents channel change determination unit determines that an instruction to change a contents channel has been issued, selects a terminal apparatus, from among the other terminal apparatus connected by the connection unit, or the previously connected terminal apparatus stored by the connection terminal apparatus storage unit in the terminal apparatus, corresponding to the contents channel for which the change instruction has been issued, as a connection destination candidate introduction terminal apparatus which introduces a connection destination candidate;
a second connection destination candidate request unit which requests a connection destination candidate, corresponding to the contents channel for which the change instruction has been issued, of the connection destination candidate introduction terminal apparatus selected by the connection destination candidate introduction terminal apparatus selection unit;

a second connection destination candidate selection unit which selects a connection destination candidate corresponding to the contents channel requested by the second connection destination candidate request unit;

a second connection destination candidate notification unit which notifies the terminal apparatus which has requested the connection destination candidate of the connection destination candidate selected by the second connection destination candidate selection unit;

a connection destination candidate reception unit which receives the connection destination candidate reported by the second connection destination candidate notification unit; and a first connection destination candidate request unit which, in the event that no connection destination candidate is received, by the connection destination candidate reception unit, from the connection destination candidate introduction terminal apparatus, requests a connection destination candidate, corresponding to the contents channel for which the change instruction has been issued, of the connection management apparatus, wherein the connection destination candidate reception unit has a function of receiving a connection destination candidate corresponding to a predetermined contents channel reported by the first connection destination candidate notification unit, and the connection unit has a function of connecting to the connection destination candidate received by the connection destination candidate reception unit.

3. A terminal apparatus in a contents data distribution system including: a contents distribution apparatus which distributes contents data via a network; and a plurality of the terminal apparatus which, being connected in a multi-leveled hierarchical structure on the network for each of a plurality of contents channels, with the contents distribution apparatus as an apex, receive the contents data via the network, and reproduce the contents data, comprising:

a connection unit which connects to the contents distribution apparatus or to other terminal apparatus, via the network;

a connection terminal apparatus storage unit which stores a terminal apparatus previously connected by the connection unit, correlated to a contents channel;

a contents channel change determination unit which determines whether or not a change instruction, changing a contents channel, has been issued;

a connection destination candidate introduction terminal apparatus selection unit which, in the event that the contents channel change determination unit determines that an instruction to change a contents channel has been issued, selects a terminal apparatus, from among the other terminal apparatus connected by the connection unit, or the previously connected terminal apparatus stored by the connection terminal apparatus storage unit in the terminal apparatus, corresponding to the contents channel for which the change instruction has been issued, as a connection destination candidate introduction terminal apparatus which introduces a connection destination candidate;

a connection destination candidate request unit which requests a connection destination candidate, corresponding to the contents channel for which the change instruction has been issued, of the connection destination candidate introduction terminal apparatus selected by the connection destination candidate introduction terminal apparatus selection unit;

a connection destination candidate selection unit which selects a connection destination candidate corresponding to the contents channel requested by the connection destination candidate request unit;

a connection destination candidate notification unit which notifies the terminal apparatus which has requested the connection destination candidate of the connection destination candidate selected by the connection destination candidate selection unit; and a connection destination candidate reception unit which receives the connection destination candidate reported by the connection destination candidate notification unit, wherein the connection unit has a function of connecting to the connection destination candidate received by the connection destination candidate reception unit.

4. A terminal apparatus in a contents data distribution system including: a contents distribution apparatus which distributes contents data via a network; a plurality of the terminal apparatus which, being connected in a multi-leveled hierarchical structure on the network for each of a plurality of contents channels, with the contents distribution apparatus as an apex, receive the contents data via the network, and reproduce the contents data; and a connection management apparatus which manages a connection condition of the contents distribution apparatus and plurality of terminal apparatus on the network, comprising:

a connection unit which connects to the contents distribution apparatus or to other terminal apparatus, via the network;

a connection terminal apparatus storage unit which stores a terminal apparatus previously connected by the connection unit, correlated to a contents channel;

a contents channel change determination unit which determines whether or not a change instruction, changing a contents channel, has been issued;

a connection destination candidate introduction terminal apparatus selection unit which, in the event that the contents channel change determination unit determines that an instruction to change a contents channel has been issued, selects a terminal apparatus, from among the other terminal apparatus connected by the connection unit, or the previously connected terminal apparatus stored by the connection terminal apparatus storage unit in the terminal apparatus, corresponding to the contents channel for which the change instruction has been issued, as a connection destination candidate introduction terminal apparatus which introduces a connection destination candidate;

a connection destination candidate request unit which requests a connection destination candidate, corresponding to the contents channel for which the change instruction has been issued, of the connection destination candidate introduction terminal apparatus selected by the connection destination candidate introduction terminal apparatus selection unit;

a connection destination candidate selection unit which selects a connection destination candidate corresponding to the contents channel requested by the connection destination candidate request unit;

a connection destination candidate notification unit which notifies the terminal apparatus which has requested the connection destination candidate of the connection destination candidate selected by the connection destination candidate selection unit;

a connection destination candidate reception unit which receives the connection destination candidate reported by the connection destination candidate notification unit; and a first connection destination candidate request unit which, in the event that no connection destination candidate is received, by the connection destination candidate reception unit, from the connection destination candidate introduction terminal apparatus, requests a connection destination candidate, corresponding to the contents channel for which the change instruction has been issued, of the connection management apparatus, wherein the connection unit has a function of connecting to the connection destination candidate received by the connection destination candidate reception unit.

5. The terminal apparatus according to claim 4, further comprising:

a terminal apparatus storage determination unit which determines whether or not there is stored, among the terminal apparatus stored in the connection terminal apparatus storage unit, a terminal apparatus corresponding to the contents channel for which the change instruction has been issued;

a terminal apparatus inquiry unit which, in the event that the terminal apparatus storage determination unit determines that no terminal apparatus corresponding to the contents channel for which the change instruction has been issued is stored, makes an inquiry, to another terminal apparatus connected on an upper level or a lower level, for a terminal apparatus corresponding to the contents channel for which the change instruction has been issued; and a terminal apparatus reception unit which receives a terminal apparatus corresponding to the contents channel for which the change instruction has been issued, inquired for by the terminal apparatus inquiry unit, wherein the connection destination candidate introduction terminal apparatus selection unit has a function of, in the event that the terminal apparatus storage determination unit determines that there is stored a terminal apparatus corresponding to the contents channel for which the change instruction has been issued, selecting the terminal apparatus as the connection destination candidate introduction terminal apparatus and, in the event that the terminal apparatus storage determination unit determines that no terminal apparatus corresponding to the contents channel for which the change instruction has been issued is stored, selecting a terminal apparatus, received by the terminal apparatus reception unit and stored by the connection apparatus storage unit in another terminal apparatus, corresponding to the contents channel for which the change instruction has been issued, as the connection destination candidate introduction terminal apparatus.

6. The terminal apparatus according to claim 5, further comprising:

a terminal apparatus inquiry reception unit which receives, from another terminal apparatus, an inquiry for a terminal apparatus corresponding to a predetermined contents channel, wherein the terminal apparatus storage determination unit has a function of, in the event of receiving an inquiry by means of the terminal apparatus inquiry reception unit, determining whether or not there is stored, among the terminal apparatus stored in the connection terminal apparatus storage unit, a terminal apparatus corresponding to the predetermined contents channel, the terminal apparatus further comprising:

a terminal apparatus notification unit which, in the event of receiving an inquiry by means of the terminal apparatus inquiry reception unit, when the terminal apparatus storage determination unit determines that there is stored a terminal apparatus corresponding to the predetermined contents channel, notifies the terminal apparatus which has made the inquiry for the terminal apparatus, wherein the terminal apparatus inquiry unit has a function of, in the event of receiving an inquiry by means of the terminal apparatus inquiry reception unit, when the terminal apparatus storage determination unit determines that no terminal apparatus corresponding to the predetermined contents channel is stored, making an inquiry to another terminal apparatus, connected on an upper level or on a lower level, for a terminal apparatus corresponding to the predetermined contents channel.

7. The terminal apparatus according to claim 6, further comprising:

an inquiry level quantity counting unit which counts a quantity of levels at which an inquiry has been made by the terminal apparatus inquiry unit; and an inquiry level quantity determination unit which determines whether or not an inquiry level quantity counted by the inquiry level quantity counting unit has not reached more than a predetermined quantity, wherein the terminal apparatus inquiry unit has a function of, in the event of receiving an inquiry by means of the terminal apparatus inquiry reception unit, when the terminal apparatus storage determination unit determines that no terminal apparatus corresponding to the predetermined contents channel is stored, on a condition that the inquiry level quantity counted by the inquiry level quantity determination unit has not reached more than the predetermined quantity, making an inquiry to another terminal apparatus, connected on an upper level or on a lower level, for a terminal apparatus corresponding to the predetermined contents channel or, on a condition that the inquiry level quantity has reached more than the predetermined quantity, carrying out a control forbidding inquiries to other terminal apparatus.

8. The terminal apparatus according to claim 4, wherein the connection destination candidate introduction terminal apparatus selection unit has a function of, in the event that there is a plurality of terminal apparatus corresponding to the contents channel for which the change instruction has been issued, randomly selecting any one of the plurality of terminal apparatus as the connection destination candidate introduction terminal apparatus.

9. The terminal apparatus according to claim 4, wherein the connection terminal apparatus storage unit has a function of storing a connection time, for which a previously connected terminal apparatus has been connected by the connection unit, correlated to the terminal apparatus previously connected by the connection unit, and a contents channel of the relevant terminal apparatus, and the connection destination candidate introduction terminal apparatus selection unit has a function of, in the event that there is a plurality of terminal apparatus corresponding to the contents channel for which the change instruction has been issued, selecting a terminal apparatus, from the plurality of terminal apparatus, of which the connection time stored by the connection terminal apparatus storage unit is the most recent as the connection destination candidate introduction terminal apparatus.

10. The terminal apparatus according to claim 4, wherein the connection destination candidate introduction terminal apparatus selection unit has a function of selecting a terminal apparatus which is first to be received by the terminal apparatus reception unit as the connection destination candidate introduction terminal apparatus.

11. The terminal apparatus according to claim 4, further comprising:
a contents channel connection determination unit which, in the event of being requested for a connection destination candidate by the connection destination candidate request unit, determines whether or not the terminal apparatus which has been requested for the connection destination candidate is a terminal apparatus corresponding to the contents channel in the request.

12. The terminal apparatus according to claim 11, further comprising:
a connection determination unit which, in the event of being requested for a connection destination candidate by the connection destination candidate request unit, when the contents channel connection determination unit determines that the terminal apparatus which has been requested for the connection destination candidate is a terminal apparatus corresponding to the contents channel in the request, determines whether or not it is possible to connect to the terminal apparatus which has been requested for the connection destination candidate, wherein
the connection destination candidate selection unit has a function of, in the event that the connection determination unit determines that the connection is possible, selecting the terminal apparatus which has been requested as the connection destination candidate.

13. The terminal apparatus according to claim 12, further comprising:
a connection possible terminal apparatus inquiry unit which, in the event that the connection determination unit determines that the connection is not possible, makes an inquiry, to a terminal apparatus on an upper level or a lower level, for a terminal apparatus to which a connection is possible, wherein
the connection destination candidate selection unit has a function of selecting a terminal apparatus to which a connection is possible, for which the inquiry has been made by the connection possible terminal apparatus inquiry unit, as the connection destination candidate.

14. A recording medium on which is recorded a program for causing a computer to function as each unit in the terminal apparatus according to claim 3.

15. A contents distribution method in a contents data distribution system including: a contents distribution apparatus which distributes contents data via a network; and a plurality of terminal apparatus which, being connected in a multi-leveled hierarchical structure on the network for each of a plurality of contents channels, with the contents distribution apparatus as an apex, receive the contents data via the network, and reproduce the contents data, comprising:
a connection step of the terminal apparatus connecting to the contents distribution apparatus or to other terminal apparatus, via the network;
a connection terminal apparatus storage step of the terminal apparatus storing a terminal apparatus previously connected by the connection step, correlated to a contents channel;
a contents channel change determination step of the terminal apparatus determining whether or not a change instruction, changing a contents channel, has been issued;
a connection destination candidate introduction terminal apparatus selection step of the terminal apparatus, in the event that the contents channel change determination step determines that an instruction to change a contents channel has been issued, selecting a terminal apparatus, from among the other terminal apparatus connected by the connection step, or the previously connected terminal apparatus stored by the connection terminal apparatus storage step in the terminal apparatus, corresponding to the contents channel for which the change instruction has been issued, as a connection destination candidate introduction terminal apparatus which introduces a connection destination candidate;
a connection destination candidate request step of the terminal apparatus requesting a connection destination candidate, corresponding to the contents channel for which the change instruction has been issued, of the connection destination candidate introduction terminal apparatus selected by the connection destination candidate introduction terminal apparatus selection step;
a connection destination candidate selection step of the terminal apparatus selecting a connection destination candidate corresponding to the contents channel requested by the connection destination candidate request step;
a connection destination candidate notification step of the terminal apparatus notifying the terminal apparatus which has requested the connection destination candidate of the connection destination candidate selected by the connection destination candidate selection step; and
a connection destination candidate reception step of the terminal apparatus receiving the connection destination candidate reported by the connection destination candidate notification step, wherein
the connection step has a step of connecting to the connection destination candidate received by the connection destination candidate reception step.

16. A contents distribution method in a contents data distribution system including: a contents distribution apparatus which distributes contents data via a network; a plurality of terminal apparatus which receive the contents data via the network, and reproduce the contents data; and a connection management apparatus which manages a connection condition of the contents distribution apparatus and plurality of terminal apparatus on the network, comprising:
a connection condition information storage step of the connection management apparatus storing connection condition information of the plurality of terminal apparatus, connected in a multi-leveled hierarchical structure on the network for each of a plurality of contents channels, with the contents distribution apparatus as an apex;
a first connection destination candidate selection step of the connection management apparatus unit, based on the connection condition information stored by the connection condition information storage step, selecting a connection destination candidate so that a plurality of terminal apparatus are connected in a multi-leveled hierarchical structure on the network, with the contents distribution apparatus as an apex;
a first connection destination candidate notification step of the connection management apparatus notifying a terminal apparatus of a connection destination candidate selected by the first connection destination candidate selection step;

a connection step of the terminal apparatus connecting to the contents distribution apparatus or to other terminal apparatus, via the network;

a connection terminal apparatus storage step of the terminal apparatus storing a terminal apparatus previously connected by the connection step, correlated to a contents channel;

a contents channel change determination step of the terminal apparatus determining whether or not a change instruction, changing a contents channel, has been issued;

a connection destination candidate introduction terminal apparatus selection step of the terminal apparatus, in the event that the contents channel change determination step determines that an instruction to change a contents channel has been issued, selecting a terminal apparatus, from among the other terminal apparatus connected by the connection step, or the previously connected terminal apparatus stored by the connection terminal apparatus storage step in the terminal apparatus, corresponding to the contents channel for which the change instruction has been issued, as a connection destination candidate introduction terminal apparatus which introduces a connection destination candidate;

a second connection destination candidate request step of the terminal apparatus requesting a connection destination candidate, corresponding to the contents channel for which the change instruction has been issued, of the connection destination candidate introduction terminal apparatus selected by the connection destination candidate introduction terminal apparatus selection step;

a second connection destination candidate selection step of the terminal apparatus selecting a connection destination candidate corresponding to the contents channel requested by the second connection destination candidate request step;

a second connection destination candidate notification step of the terminal apparatus notifying the terminal apparatus which has requested the connection destination candidate of the connection destination candidate selected by the second connection destination candidate selection step;

a connection destination candidate reception step of the terminal apparatus receiving the connection destination candidate reported by the second connection destination candidate notification step; and a first connection destination candidate request step of the terminal unit, in the event that no connection destination candidate is received, by the connection destination candidate reception step, from the connection destination candidate introduction terminal apparatus, requesting a connection destination candidate, corresponding to the contents channel for which the change instruction has been issued, of the connection management apparatus, wherein the connection destination candidate reception step has a step of receiving a connection destination candidate corresponding to a predetermined contents channel reported by the first connection destination candidate notification step, and the connection step has a step of connecting to the connection destination candidate received by the connection destination candidate reception step.

17. A recording medium on which is recorded a program for causing a computer to function as each unit in the terminal apparatus according to claim 4.

* * * * *